United States Patent
Williams

(10) Patent No.: US 9,787,154 B2
(45) Date of Patent: Oct. 10, 2017

(54) ELECTRIC MOTOR WITH HALBACH ARRAY AND FERROFLUID CORE

(71) Applicant: 140ENERGY, INC., Tracy, CA (US)

(72) Inventor: Elijah Jacob Williams, Tracy, CA (US)

(73) Assignee: 140Energy, Inc., Tracy, CA (US)

(*) Notice: Subject to any disclaimer, the term of this patent is extended or adjusted under 35 U.S.C. 154(b) by 0 days.

(21) Appl. No.: 15/300,154

(22) PCT Filed: Mar. 25, 2015

(86) PCT No.: PCT/US2015/022562
§ 371 (c)(1),
(2) Date: Sep. 28, 2016

(87) PCT Pub. No.: WO2015/148719
PCT Pub. Date: Oct. 1, 2015

(65) Prior Publication Data
US 2017/0126083 A1    May 4, 2017

Related U.S. Application Data

(60) Provisional application No. 61/970,719, filed on Mar. 26, 2014.

(51) Int. Cl.
*H02K 3/18* (2006.01)
*H02K 1/27* (2006.01)
*H02K 1/02* (2006.01)
*H02K 1/20* (2006.01)

(52) U.S. Cl.
CPC ............... *H02K 3/18* (2013.01); *H02K 1/02* (2013.01); *H02K 1/20* (2013.01); *H02K 1/278* (2013.01)

(58) Field of Classification Search
CPC ....... B60L 13/03; B60L 15/025; B60W 10/08; H02K 21/12; H02K 21/14; H02K 21/16; H02K 21/18; H02K 21/20; H02K 21/22; H02K 21/24; H02P 6/14
USPC ........................................ 310/156.43–156.47
See application file for complete search history.

(56) References Cited

U.S. PATENT DOCUMENTS

| | | | |
|---|---|---|---|
| 4,127,802 A * | 11/1978 | Johnson | H02K 37/18 310/114 |
| 7,598,646 B2 | 10/2009 | Cleveland | |
| 2012/0019182 A1* | 1/2012 | Otsuka | H02K 7/00 318/400.23 |
| 2013/0134823 A1* | 5/2013 | Yamada | H02K 1/24 310/216.004 |

OTHER PUBLICATIONS

Gallo, C.A., "Halbach Magnetic Rotor Development," NASA/TM-2008-215056, Glenn Research Center, Cleveland, Ohio, Feb. 2008, 25 Pages.

(Continued)

*Primary Examiner* — Tran Nguyen
(74) *Attorney, Agent, or Firm* — Fenwick & West LLP

(57) ABSTRACT

An electric motor apparatus is described that utilizes a Halbach array and a ferrofluid core. The electric motor comprises a rotor assembly and a stator assembly, each of which utilizes a Halbach array. A ferrofluid core is utilized in the stator, which results in a motor that is less susceptible to core loss and operates with increased efficiency.

20 Claims, 24 Drawing Sheets

(56) References Cited

OTHER PUBLICATIONS

Merritt, B.T., et al., "Halbach Array Motor/Generators—A Novel Generalized Electric Machine," Lawrence Livermore National Laboratory, UCRL-JC-119050, Halback Festschrift Symposium, Berkeley, California, Feb. 3, 1995, 8 Pages.

Patent Cooperation Treaty, International Search Report and Written Opinion of the International Searching Authority, International Patent Application No. PCT/US2015/022562, Jul. 6, 2015, 14 Pages.

* cited by examiner

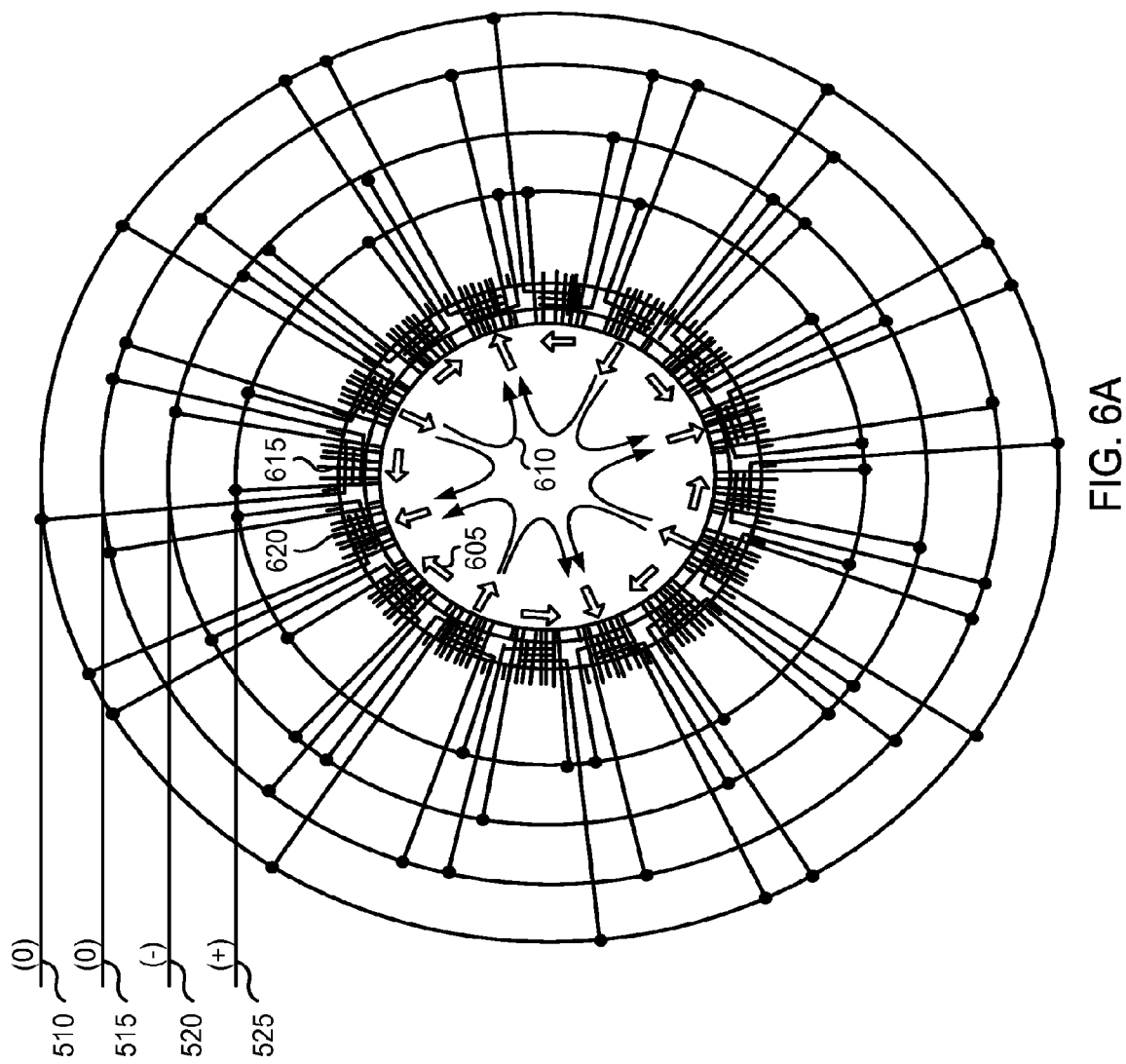

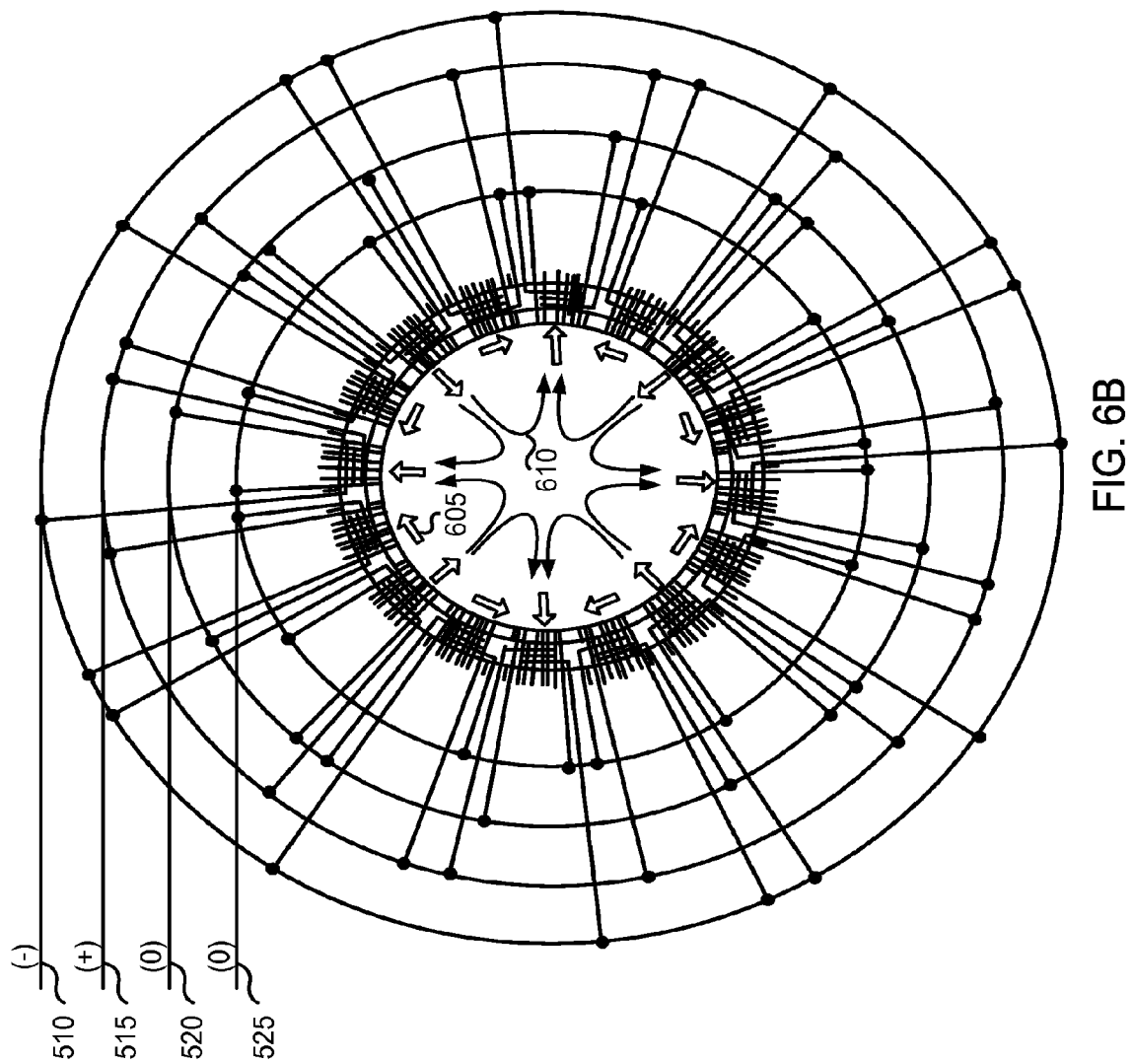

ELECTRIC MOTOR WITH HALBACH ARRAY AND FERROFLUID CORE

CROSS-REFERENCE TO RELATED APPLICATIONS

This application claims the benefit of U.S. Provisional Patent Application No. 61/970,719, filed Mar. 26, 2014, the contents of which are incorporated by reference in its entirety for all purposes.

BACKGROUND

1. Field of Art

The disclosure generally relates to the field of electric motors.

2. Description of the Related Art

Many different designs currently exist for electric motors. An electric motor is an electric machine that converts electrical energy into kinetic energy. In order to do this, most motors use several solenoids to generate a magnetic field. A ferromagnetic core is often used to concentrate and guide the magnetic field generated by the solenoids. When the core is subjected to a changing magnetic field, the magnetization of the core changes with the changing magnetic field. The changing of the magnetization causes the ferromagnetic particles to continuously realign, generating excess heat and wasting potential energy that could be converted into mechanical energy. This process is called core loss and significantly degrades the efficiency of an electric motor. Accordingly, there is a need for a motor with increased efficiency that results from decreased core loss.

SUMMARY

An electric motor apparatus is described that utilizes a Halbach array and a ferrofluid core. The electric motor comprises a rotor assembly and a stator assembly. The rotor assembly further comprises a plurality of magnets arranged to form a Halbach array. The stator assembly further comprises a plurality of solenoids that are also arranged to form a Halbach array. The stator assembly maintains the solenoids in a stationary position with respect to the rotor assembly, while the rotor assembly rotates the Halbach array of magnets around that stationary position. Instead of using a traditional ferrous metal core, the solenoids in the stator utilize a ferrofluid core. The ferrofluid is less susceptible to overheating and aids in the dissipation of any generated heat to the surrounding structures. The use of a ferrofluid core results in a motor that is less susceptible to core loss and operates with increased efficiency.

In one embodiment, the electric motor apparatus includes a rotor means for rotating a plurality of magnets and a stator means for maintaining a plurality of solenoids in a stationary position with respect to the rotor means. In addition to the plurality of magnets, which have an inner and outer circumference, the rotor means has an outer circumference. The plurality of magnets is arranged such that their outer circumference is congruent and concentric to the outer circumference of the rotor means. This arrangement generates a diminished magnetic field outside of their outer circumference by cancelling out to near zero and an augmented magnetic field inside of their inner circumference. The stator means has an inner circumference that is greater than the outer circumference of the rotor means resulting in the stator means surrounding the rotor means. The stator means also includes a plurality of solenoids and commutation circuit that controls the plurality solenoids. Each solenoid has an inner circumference and an outer circumference and all solenoids are arranged such that their inner circumference is congruent and concentric to the inner circumference of the stator means. This arrangement generates a diminished magnetic field outside of the outer circumference of the plurality of solenoids, cancelling out to near zero, and an augmented magnetic field inside of the inner circumference of the solenoids.

BRIEF DESCRIPTION OF DRAWINGS

The disclosed embodiments have advantages and features that will be more readily apparent from the detailed description, the appended claims, and the accompanying figures (or drawings). A brief introduction of the figures is below.

FIGS. 6A-6D illustrate wiring diagrams for phases one through four of the motor commutation phases.

DETAILED DESCRIPTION

The Figures (Figs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Motor Configuration

Referring now to FIGS. 1 through 10, illustrated are the components and assemblies of a motor apparatus that utilizes a Halbach array and a ferrofluid core. It is noted that the motor can be an electric motor.

Figure 1A:
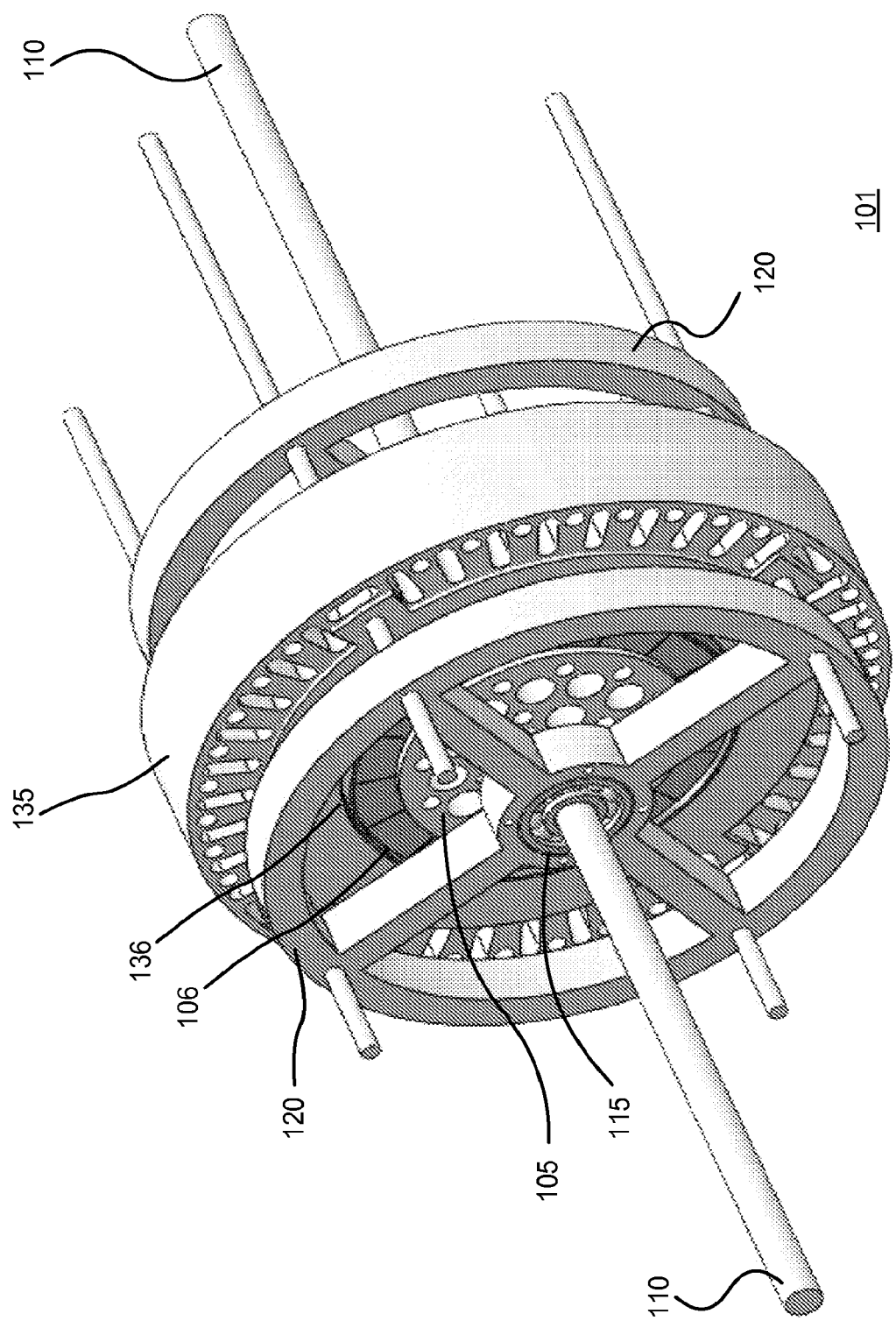
FIG. 1A illustrates a three-dimensional schematic of an electric motor.

FIG. 1A illustrates a three-dimensional schematic of an example embodiment of an electric motor 101. The electric motor includes a rotor assembly 105, rotor assembly outer circumference 106, shaft 110, bearing 115, bearing retainer 120, stator assembly 135, and stator assembly inner circumference 136. In this example embodiment, the rotor assembly 105 is roughly cylindrical in shape and comprises the shaft 110. In some embodiments, the rotor assembly 105 may have holes drilled in the center section to aid in ventilation and heat dissipation, and to reduce mass. In this example embodiment, the stator assembly 135 is roughly cylindrical in shape and in some embodiments, the stator assembly 135 may also have holes drilled around its circumference to aid in ventilation and heat dissipation, and to reduce overall mass.

The rotor assembly is positioned concentric to the stator assembly 135. The rotor assembly outer circumference 106 is slightly smaller than the stator assembly inner circumference 136, thus allowing the rotor assembly 105 to fit within the stator assembly 135. The rotor assembly 105 comprises a shaft 110 that extends on either side of the rotor assembly 105. The shaft 110 is supported by two bearings 115, which in turn are each supported by a bearing retainer 120. Each bearing retainer 120 is fixed concentric to the stator assembly 135. As a result of the rotor assembly 105 being supported by the bearings 115, the rotor assembly 105 can rotate freely within stator assembly 135.

Figure 1B:
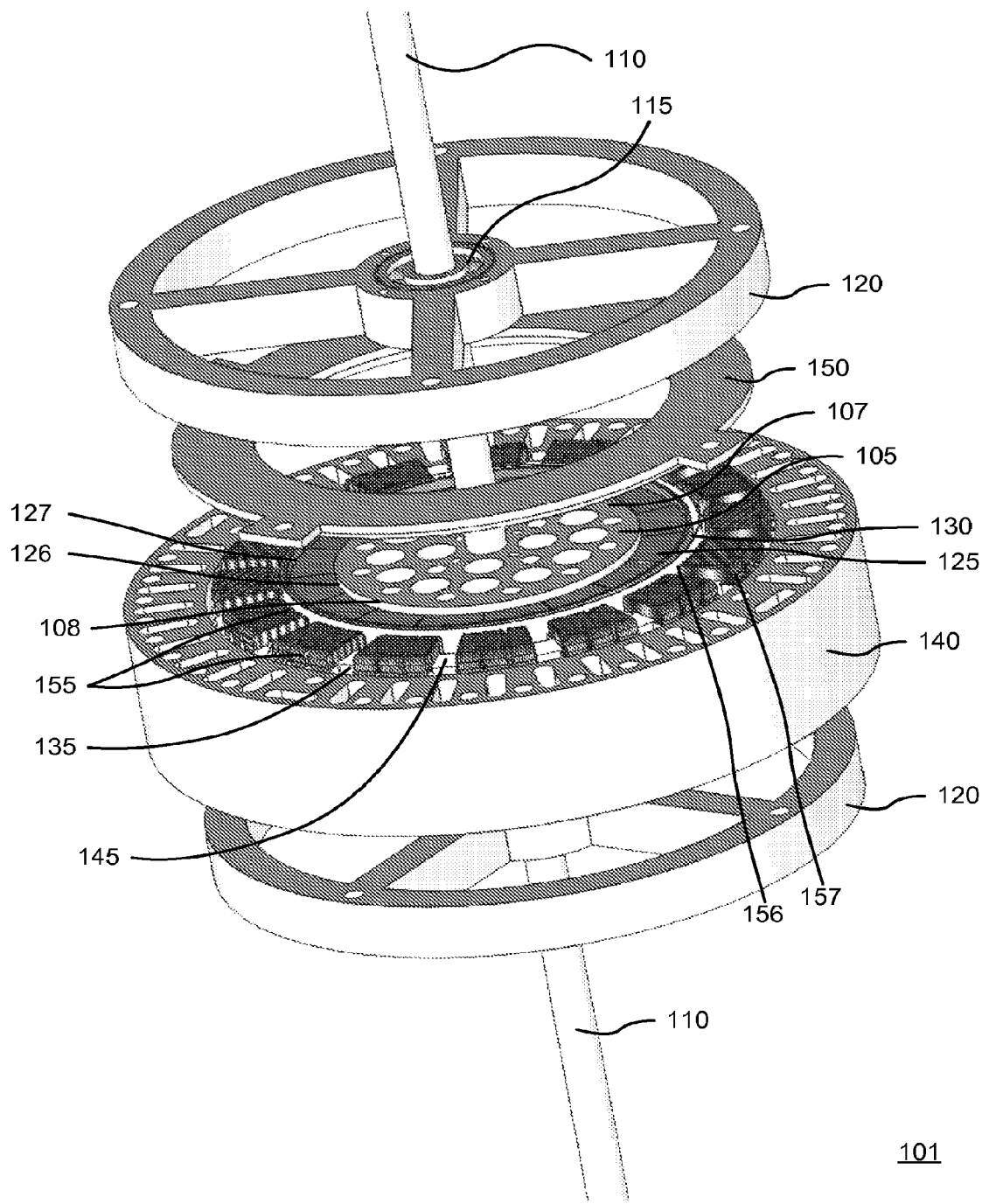
FIG. 1B illustrates a partially exploded three-dimensional schematic of an electric motor.
Figure 2:
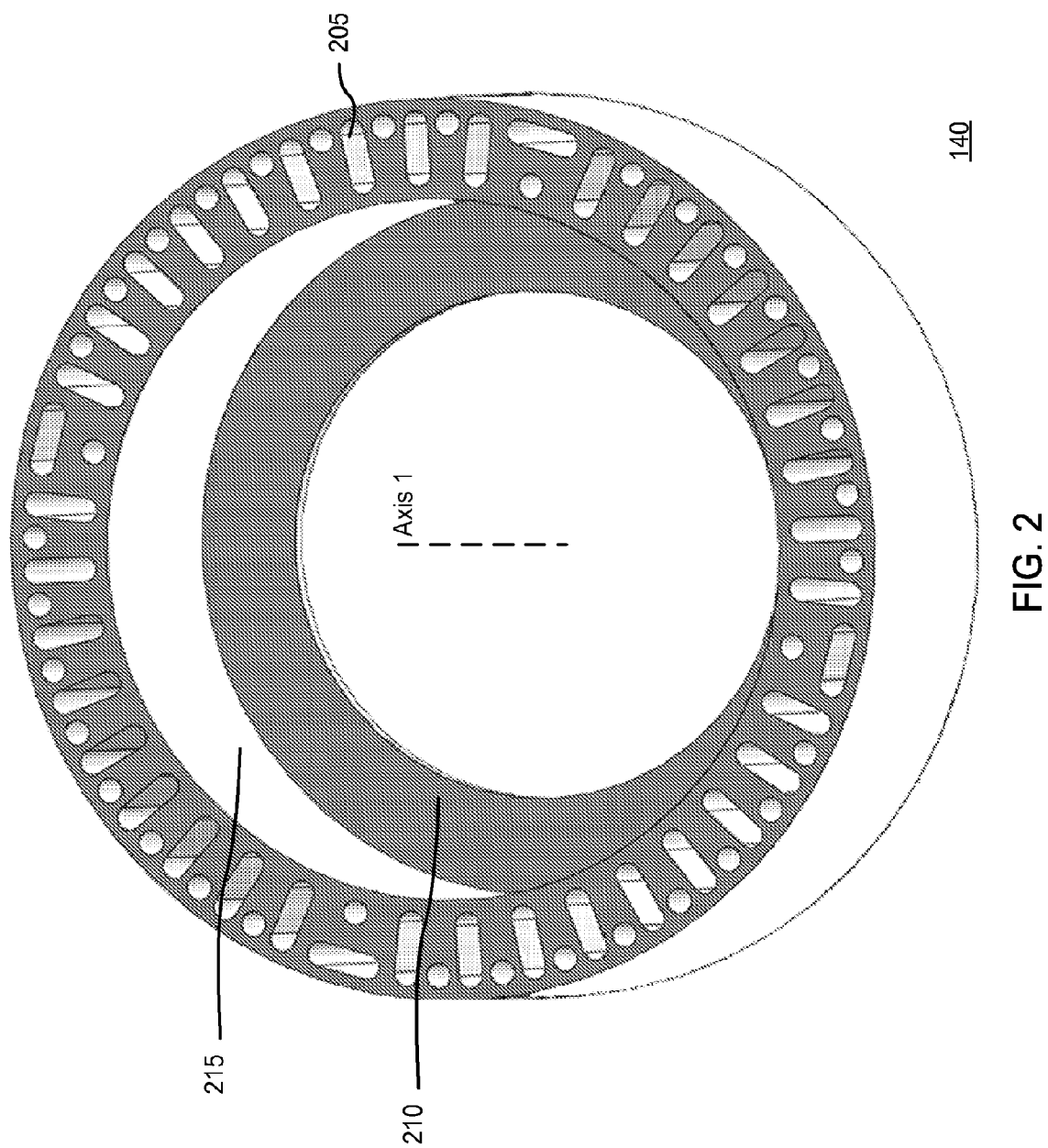
FIG. 2 illustrates a three-dimensional schematic of a motor housing.
Figure 3:
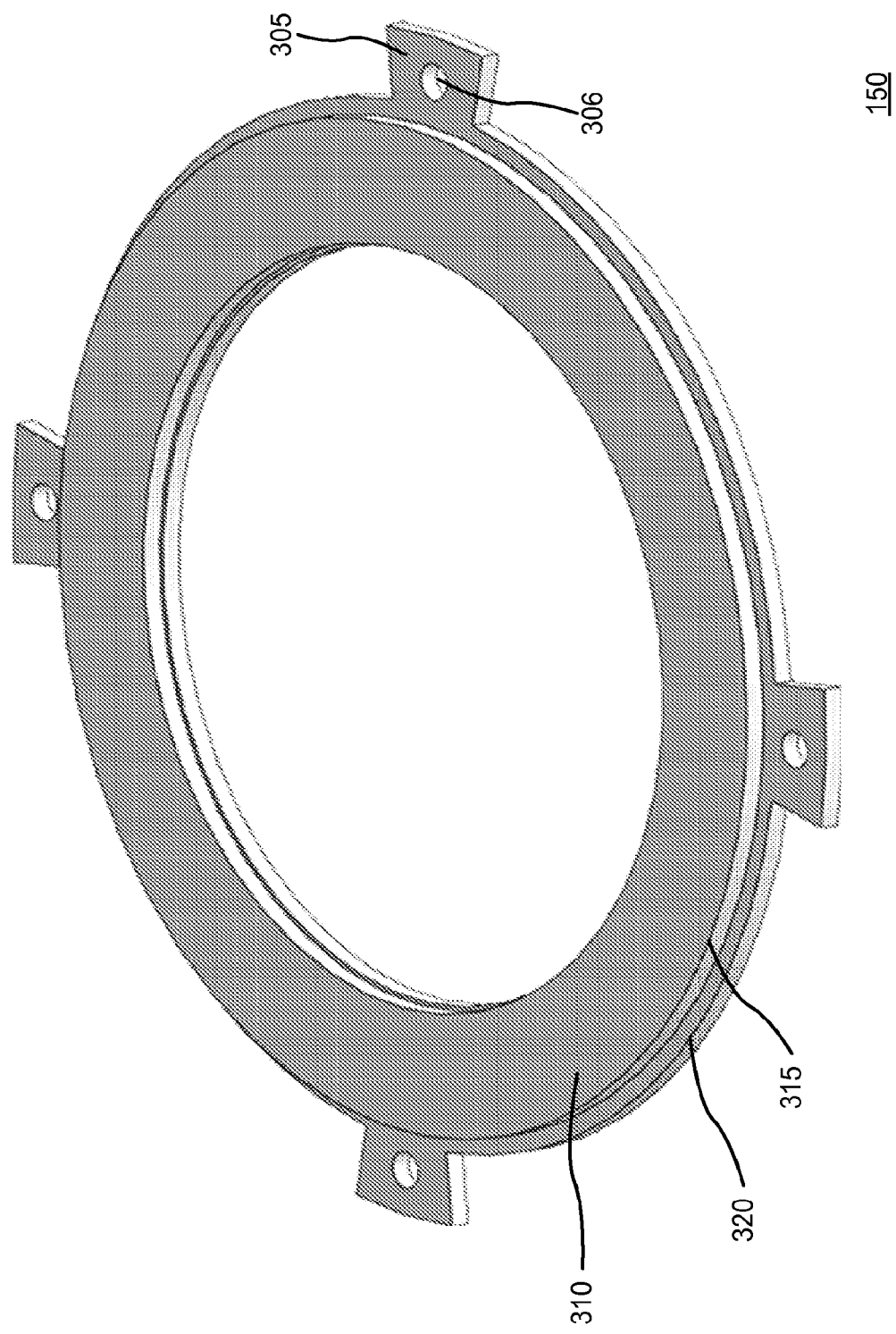
FIG. 3 illustrates a three-dimensional schematic of a retainer cap.

FIG. 1B illustrates a partially exploded three-dimensional schematic of the electric motor 101 shown in FIG. 1A. The electric motor 101 assembly comprises the rotor assembly 105 and the stator assembly 135. The rotor assembly 105 comprises the shaft buffer 107, shaft 110, plurality of magnets 125, and retaining ring 130. The shaft buffer 107 is cylindrical in shape and further comprises an outer circumference 108. In this example embodiment, each of the plurality of magnets 125 is wedge shaped such that the magnets can be assembled in an annulus. The plurality of magnets 125 further comprises an inner circumference 126 and an outer circumference 127. The stator assembly 135 comprises the bearing 115, bearing retainer 120, motor housing 140, framework 145, retainer cap 150, and plurality of solenoids 155. In the embodiment depicted in FIG. 2, the motor housing 140 is a cylindrical shell with a lip 210 and inner wall 215. In some embodiments, the motor housing 140 may have a plurality of ventilation holes 205 to aid in heat dissipation. The embodiment of the framework 145 depicted in FIG. 4A comprises an inner ring 415. The embodiment of the retainer cap 150 shown in FIG. 3 is a flat cylindrical shell with a plurality of mounting tabs 305 and an extrusion 310. The plurality of solenoids 155 comprises a plurality of tangential solenoids 430 and a plurality of radial solenoids 435 depicted in FIG. 4E. The plurality of solenoids 155 further comprises an inner circumference 156 and an outer circumference 157.

Referring back to FIG. 1B, the shaft 110 is connected to the shaft buffer 107 at the center of the shaft buffer. The shaft 110 extends on both sides of the shaft buffer 107 and each end of the shaft 110 fits inside a bearing 115. The two or more magnets 125 are arranged in an annulus around the shaft buffer 107. The outer circumference 127 of the plurality of magnets is congruent and concentric to the rotor assembly outer circumference 106. The inner circumference 126 of the plurality of magnets is congruent and concentric to the outer circumference 108 of the shaft buffer. The plurality of magnets 125 is secured to the shaft buffer 107 by the retaining ring 130.

The bearing 115 is supported by a bearing retainer 120. In some embodiments, the outer diameter of the bearing 115 may be slightly larger than the inner diameter of a recessed hole in the bearing retainer 120, resulting in an interference fit between the bearing and bearing retainer. In one example embodiment, the bearing retainer 120 is fixed to the motor housing 140 as shown in FIG. 1A. In some embodiments, the bearing retainer 120 may be secured to the motor housing 140 by the use of threaded rods. In other embodiments, the bearing retainer 120 may be secured to the motor housing 140 by the use of bolts, screws, adhesives, or other fastening methods. The framework 145 rests concentrically inside the cavity of the motor housing 140 formed by the inner wall 215 and the lip 210 of the motor housing 140. The inner ring 415 of the framework 145 fits snugly against the inner diameter of the lip 210. The retainer cap 150 fits snugly against the motor housing 140 and inner ring 415 and is secured to the motor housing 140 by the plurality of tabs 305. In some embodiments, the plurality of tabs 305 have holes 306, and screws are used to secure the retainer cap 150 to the motor housing 140. The extrusion 310 of the retainer cap sits flush against the inner wall 215 of the motor housing and the inner ring 415 of the framework 145. The plurality of solenoids 155 are formed by winding wire around the framework 145. The plurality of solenoids 155 are positioned such that the inner circumference 156 of the solenoids is congruent and concentric with the inner circumference 136 of the stator assembly 135.

The lip 210 of the motor housing 140, inner wall 215 of the motor housing 140, inner ring 415 of the framework 145, and retainer cap 150 fit together to form a sealed compartment. In some embodiments, the sealed cavity is filled with a ferrofluid. The plurality of solenoids 155 reside within the sealed compartment and thus are immersed in the ferrofluid. The advantages of using the ferrofluid are further discussed below. In one embodiment, the contact surfaces between the lip 210, inner wall 215, inner ring 415, and retainer cap 150 are machined to seal to contain the ferrofluid. In other embodiments, a sealing ring such as a rubber O-ring is used to ensure the ferrofluid is sealed within the compartment.

Figure 1C:
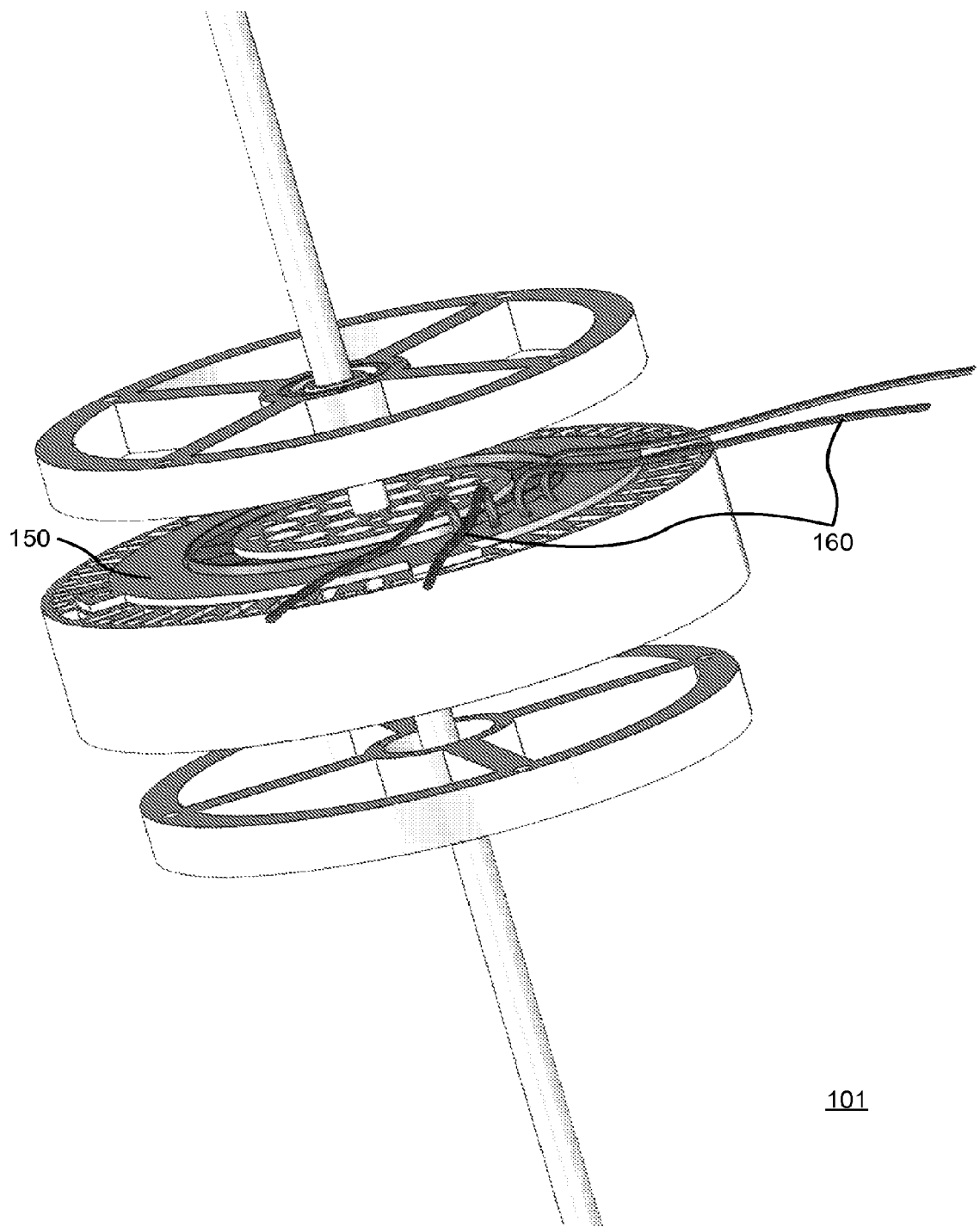
FIG. 1C illustrates a three-dimensional schematic of an electric motor.

FIG. 1C illustrates a three-dimensional schematic of the electric motor 101 shown in FIG. 1A. A plurality of electrical leads 160 enters the electric motor 101 through a plurality of holes in the retainer cap 150. The plurality of electrical leads 160 are connected to the plurality of solenoids 155.

Referring again to FIG. 2, it illustrates a three-dimensional schematic of the motor housing 140. The motor housing 140 comprises a plurality of ventilation holes 205, a lip 210, and an inner wall 215. The motor housing 140 is a cylindrical shell with the addition of the lip 210. The lip 210 is a thin surface that protrudes towards the center of the motor housing 140 from the inner wall 215. The plurality of ventilation holes aids in increasing airflow through the motor housing 140 in order to dissipate heat away from the motor housing 140. In one embodiment, the motor housing 140 is made from aluminum. In other embodiments, the motor housing 140 may be made from a variety of different materials.

Referring again to FIG. 3, it illustrates a three-dimensional schematic of the retainer cap 150. The retainer cap 150 is a flat cylindrical shell and comprises a plurality of mounting tabs 305 and an extrusion 310. The plurality of mounting tabs 305 extend outward away from the center of the retainer cap 150. In some embodiments, each of the plurality of mounting tabs 305 may have a hole 306 that is used to mount the retainer cap 150 to the motor housing 140. This example embodiment of the retainer cap 150 has four mounting tabs 305. The extrusion 310 comprises a portion of the retainer cap 150 that is slightly thicker and has a smaller outer circumference 315 than the retainer cap outer circumference 320. In one embodiment, the retainer cap 150 is made from aluminum. In other embodiments, the retainer cap 150 may be made from a variety of different materials.

Referring once more to FIG. 4A, it illustrates a three-dimensional schematic of the framework 145. The framework 145 comprises an outer plurality of fins 405, an inner plurality of fins 406, a plurality of bars 410, an inner ring 415, a middle ring 420, and an outer ring 425. The outer plurality of fins 405 extends radially from the outer ring 425 and each of the plurality of fins 405 lies perpendicular to the circumference of the outer ring 425. The plurality of bars 410 extend radially from the middle ring 420 to the outer ring 425 and are cylindrical in shape. Each of the plurality of bars 410 lies perpendicular to the circumference of the middle ring 420. The inner plurality of fins 406 extend radially from the inner ring 415 to the middle ring 420. Each of the inner plurality of fins 406 lies perpendicular to the circumference of the inner ring 415. In one embodiment, the framework 145 is made from three-dimensional printed plastic. In other embodiments, the framework 145 can be made from a variety of nonferrous materials.

Figure 4A:
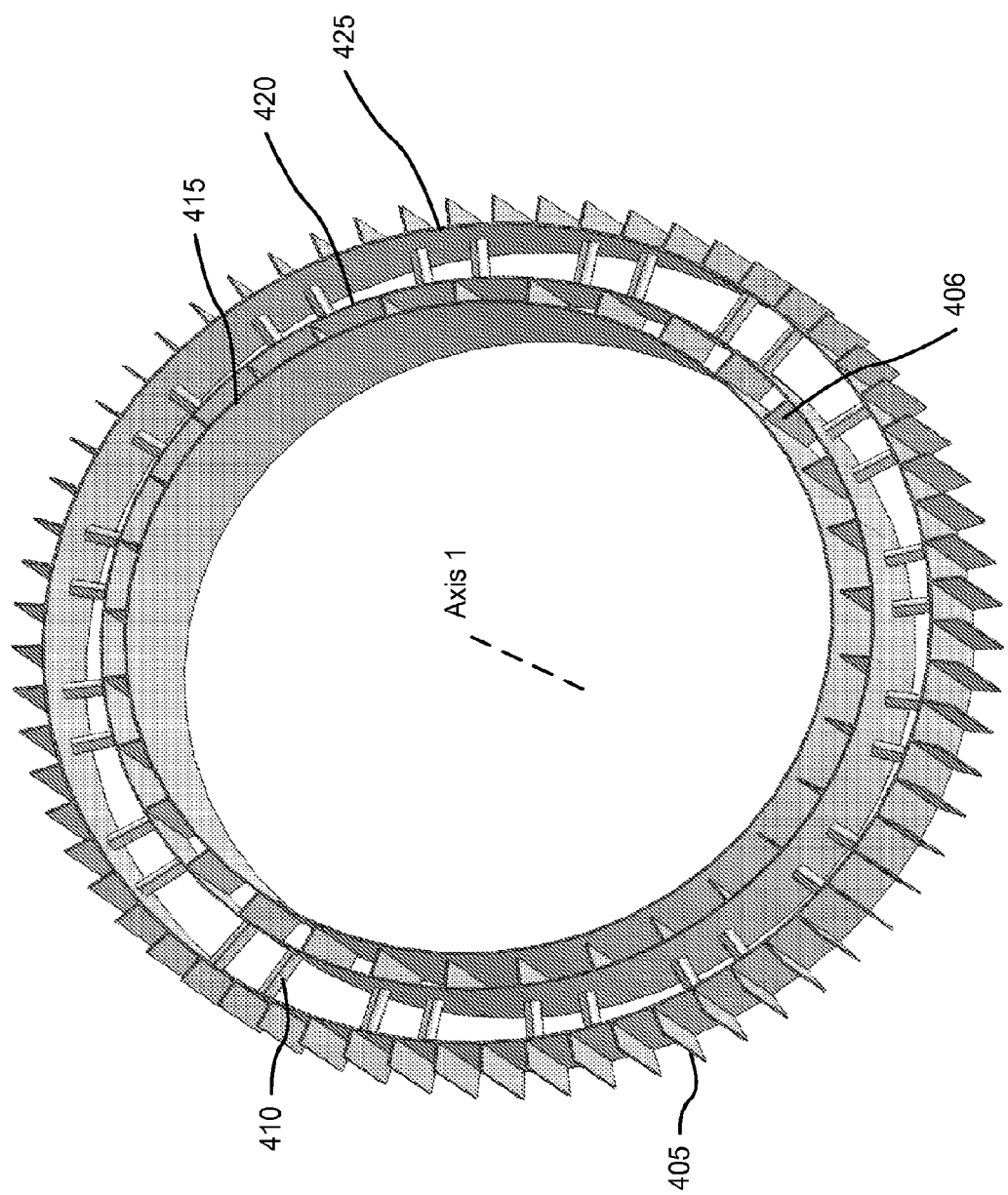
FIG. 4A illustrates a three-dimensional schematic of a framework.
Figure 4B:
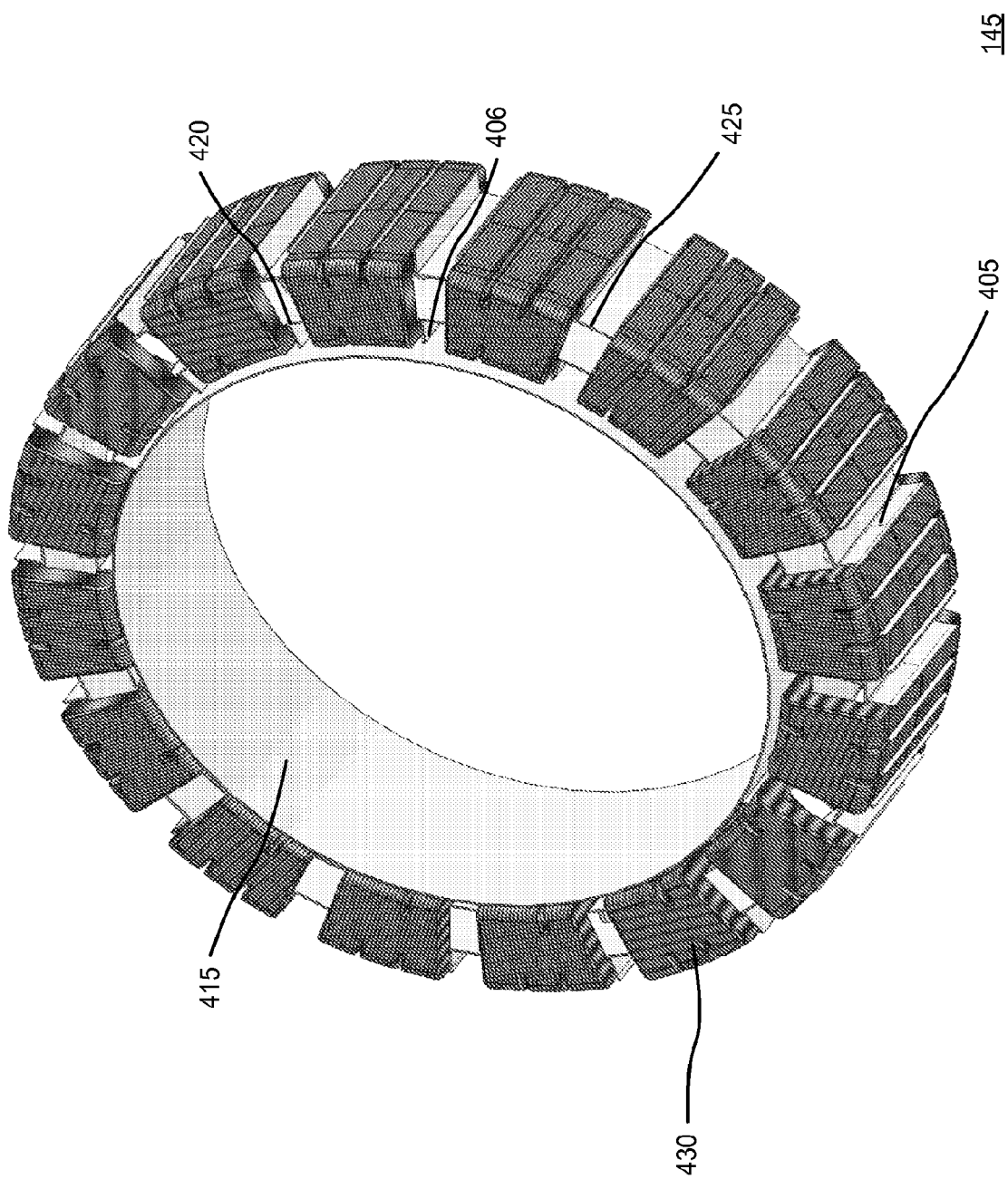
FIG. 4B illustrates a three-dimensional schematic of the framework with tangential solenoids.

FIG. 4B illustrates a three-dimensional schematic of the framework 145 depicted in FIG. 4A with the addition of wires wound around the framework to create a plurality of tangential solenoids 430. The wires for the plurality of tangential solenoids 430 are wound around the middle ring 420 and outer ring 425. The outer plurality of fins 405 and inner plurality of fins 406 prevent the plurality of tangential solenoids 430 from moving circumferentially around the framework 145. In this example embodiment, each of the plurality of tangential solenoids is in contact with four of the outer plurality of fins 405 and two of the inner plurality of fins 406.

Figure 4C:
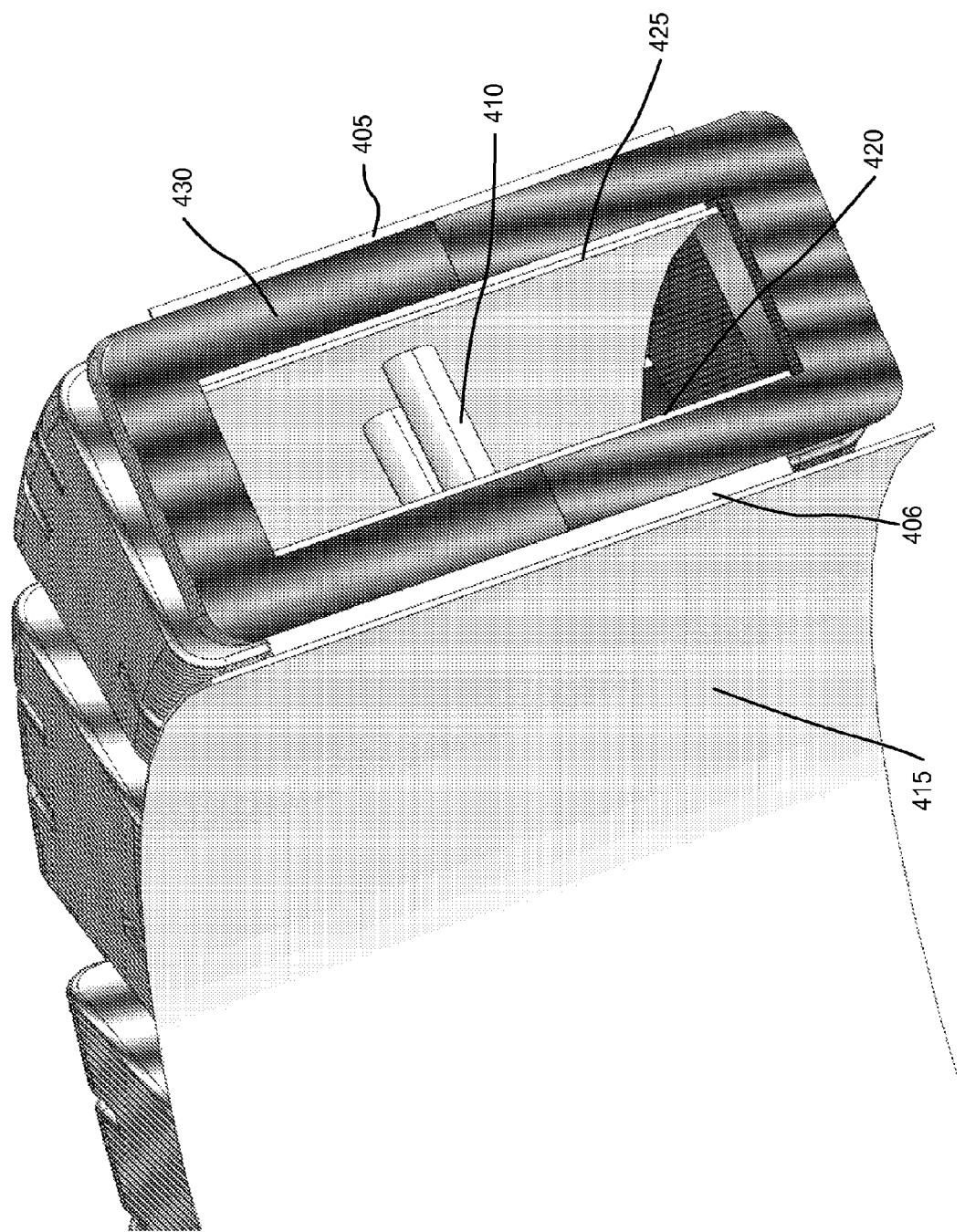
FIG. 4C illustrates a partial cross-sectional schematic of the framework with tangential solenoids.

FIG. 4C illustrates a cross-sectional view of the framework 145 and plurality of tangential solenoids 430 depicted in FIG. 4B. The bars 410 are visible in between the middle ring 420 and outer ring 425. A cross section of one of the plurality of tangential solenoids 430 is visible.

Figure 4D:
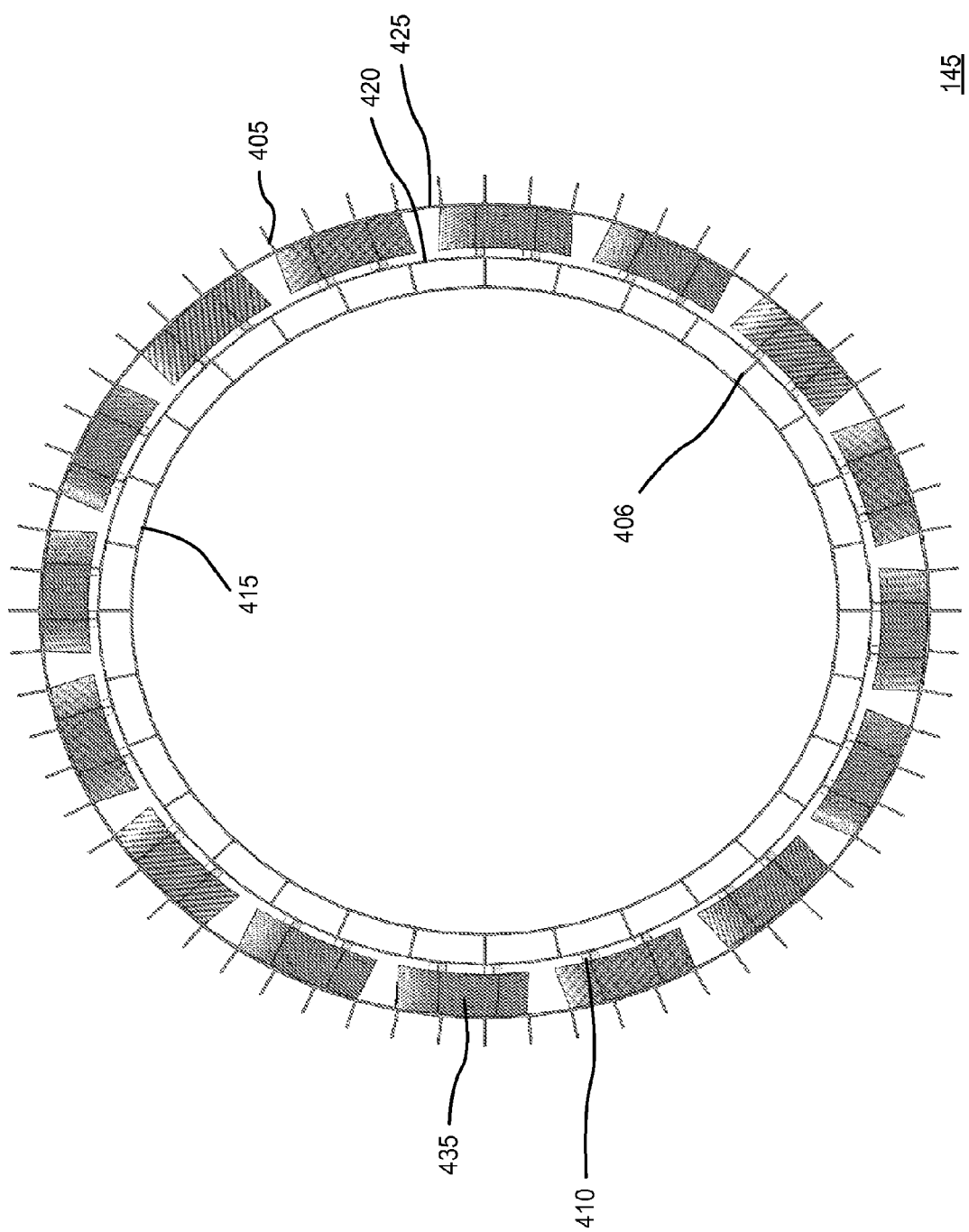
FIG. 4D illustrates a schematic of the framework with radial solenoids.

FIG. 4D illustrates a schematic of the framework 145 depicted in FIG. 4A with the addition of wires wound around the framework to create a plurality of radial solenoids 435. The wires for the plurality of radial solenoids 435 are wound around the plurality of bars 410 between the middle ring 420 and the outer ring 425. In this example embodiment, each of the plurality of radial solenoids 435 is wound around two of the plurality of bars 410.

Figure 4E:
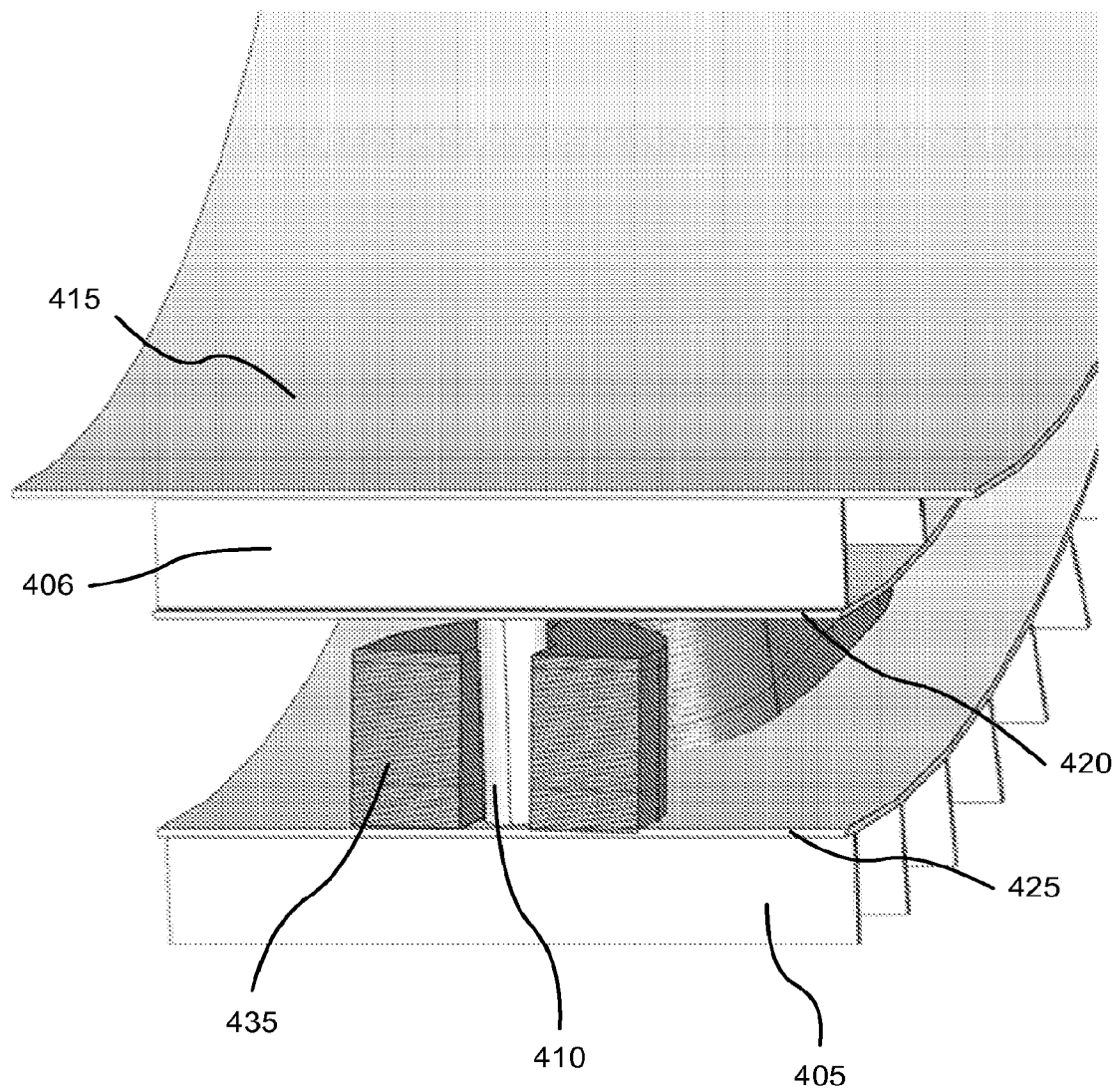
FIG. 4E illustrates a partial cross-sectional schematic of the framework with radial solenoids.
Figure 4F:
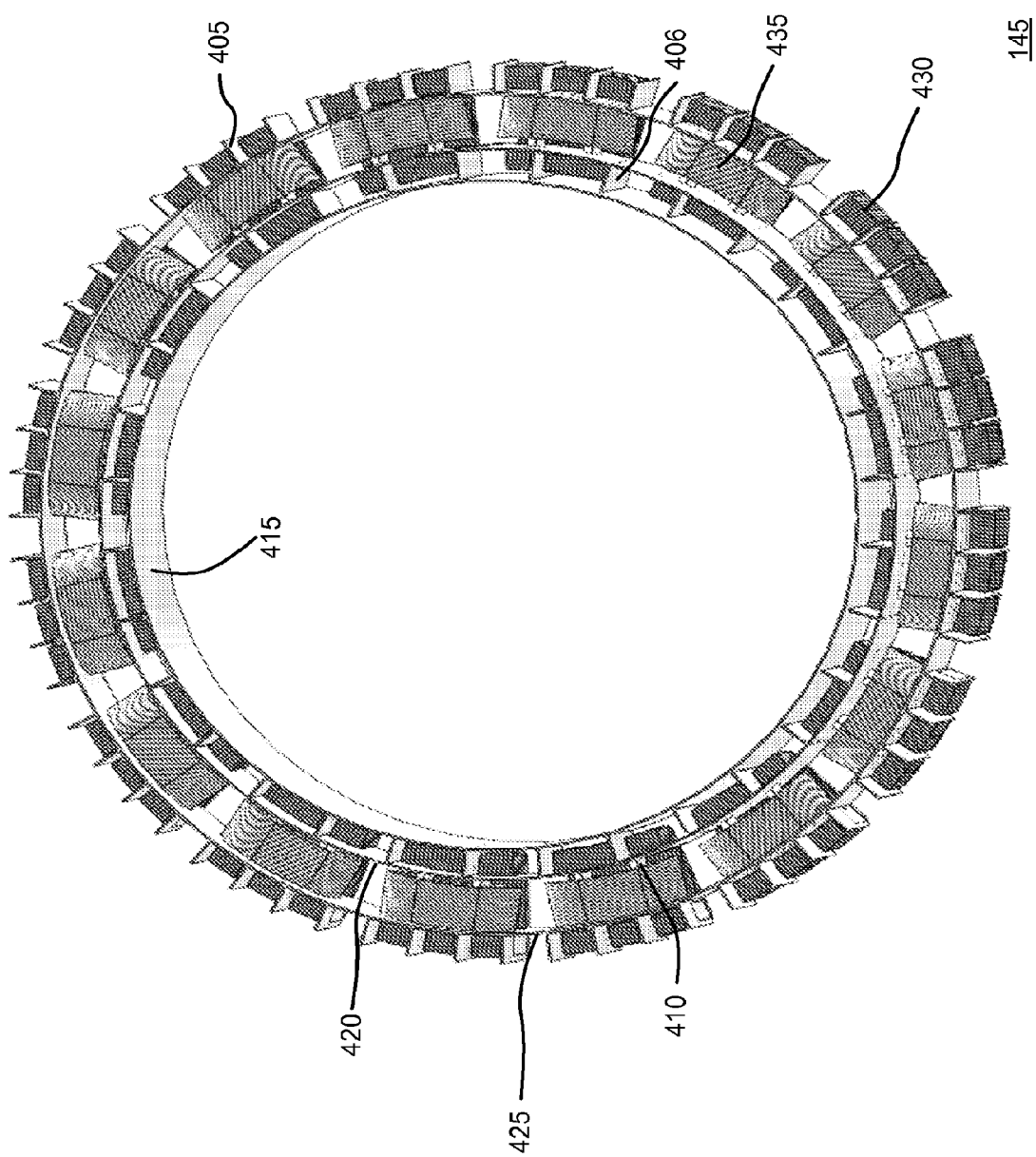
FIG. 4F illustrates a partial cross-sectional schematic of the framework with both radial and tangential solenoids.

FIG. 4E illustrates a cross-sectional view of the framework 145 and plurality of radial solenoids 435 depicted in FIG. 4F. The inner ring 415 is connected to the middle ring 420 by the inner plurality of fins 406 and the middle ring 420 is connected to the outer ring 425 by the plurality of bars 410. A cross section of one of the plurality of radial solenoids 435 is visible.

FIG. 4F illustrates a partial cross-sectional view of the framework 145 depicted in FIG. 4A with the addition of wires wound around the framework to create a plurality of tangential solenoids 430 and a plurality of radial solenoids 435. Each of the plurality of radial solenoids 435 is positioned inside a corresponding tangential solenoid 430.

Figure 4G:
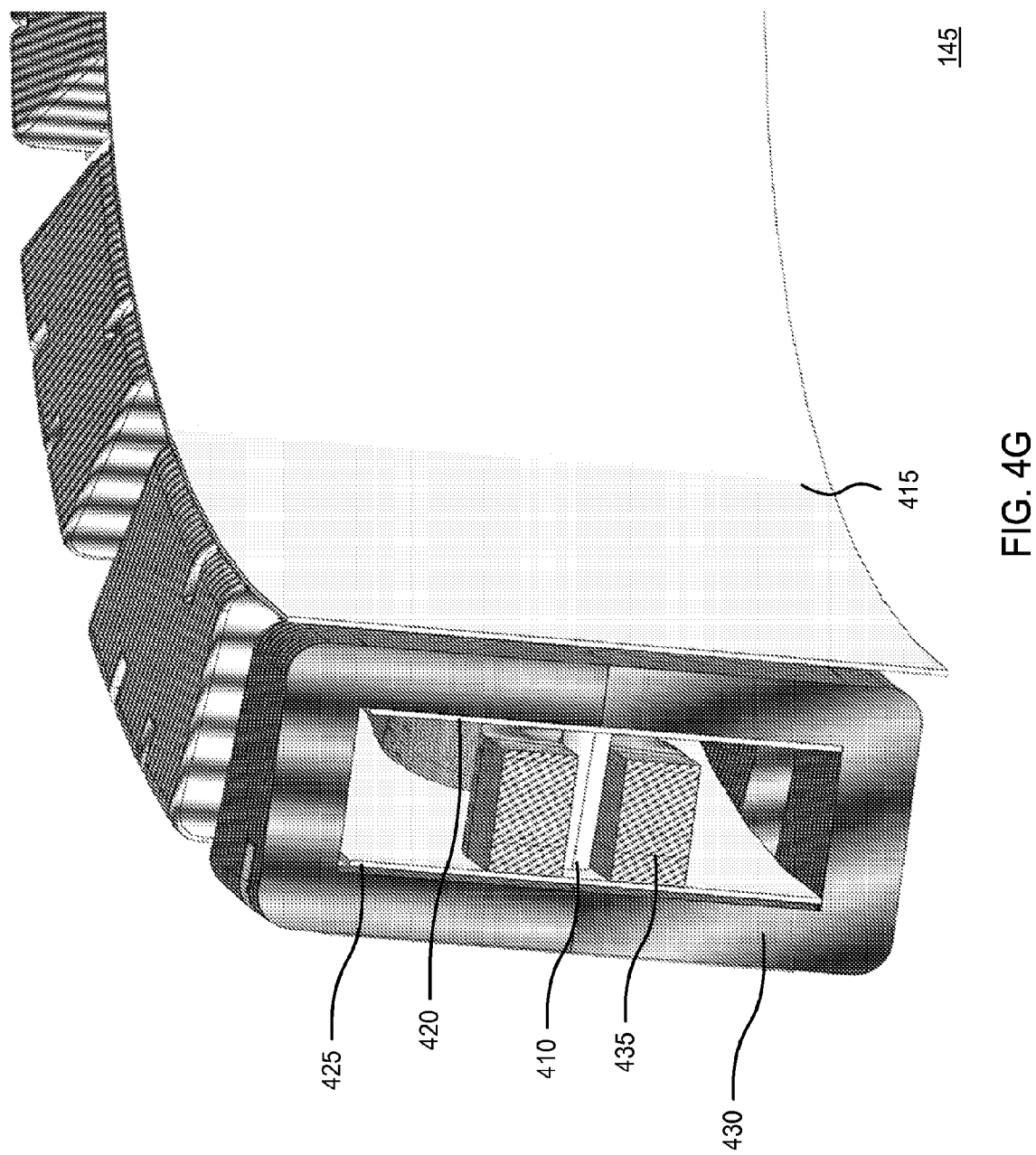
FIG. 4G illustrates a partial cross-sectional schematic of the framework with both radial and tangential solenoids.

FIG. 4G illustrates a partial cross-sectional view of the framework 145 depicted in FIG. 4A with the addition of wires wound around the framework to create a plurality of tangential solenoids 430 and a plurality of radial solenoids 435. A cross section of one of the plurality of tangential solenoids 430, a cross section of one of the plurality of radial solenoids 435, and one of the plurality of bars 410 are visible. Each of the plurality of radial solenoids 435 is positioned inside a corresponding tangential solenoid 430.

Operation of the Motor

With the structural configuration described, an example operation configuration is described. The electric motor 101 described is operated by activating the plurality of tangential solenoids 430 and the plurality of radial solenoids 435 in the specific manner described below.

A solenoid is a coil of wire wound into a tightly packed helix around an axis. A current passing through the wire generates a magnetic field concentric to the wire, and the magnetic field is predicted by the Biot-Savart Law:

$$B = \frac{\mu_o I}{4\pi} \int_{wire} \frac{dl \times r}{r^2}$$

In the equation above, B is the magnetic field, $\mu_o$ is the magnetic constant, I is the current passing through the wire, dl is the vector line element in the same direction as I, r is the distance between the wire and the point at which the magnetic field is being calculated, and r is a unit vector in the direction of r. The direction of a magnetic field lines generated by a solenoid is parallel to the axis of the solenoid.

Each of the plurality of tangential solenoids 430 generates magnetic field lines that are tangential to the circumference of the framework, and each of the plurality of radial solenoids 435 generate magnetic field lines that are radial from the center of the framework. Each of the plurality of tangential solenoids 430 and each of the plurality of radial solenoids 435 can be activated in such a way that the plurality of solenoids 155 forms a Halbach array. In one embodiment, the stator assembly has 16 tangential and 16 radial solenoids, which can be activated such that the plurality of solenoids forms an 8-pole ("oct-pole") Halbach array. In some embodiments, the wires used for tangential and/or radial solenoids litz wires. In some embodiments, each of the litz wires consists of 10 wire strands with each strand being a 32 American Wire Gauge (AWG) insulated magnet wire. A benefit of the litz wire, typically used to carry alternating current, is to reduce the wire's skin and proximity effect losses that occur in conductors at higher current frequencies, e.g. up to about the MHz range. In some embodiments, the litz wire includes multiple thin wire strands, which are individually insulated and woven together according to a particular twisting pattern. In some embodiments, the litz wire multiple levels of twist patterns with each level being an individual group of twisted wires.

Figure 5A:
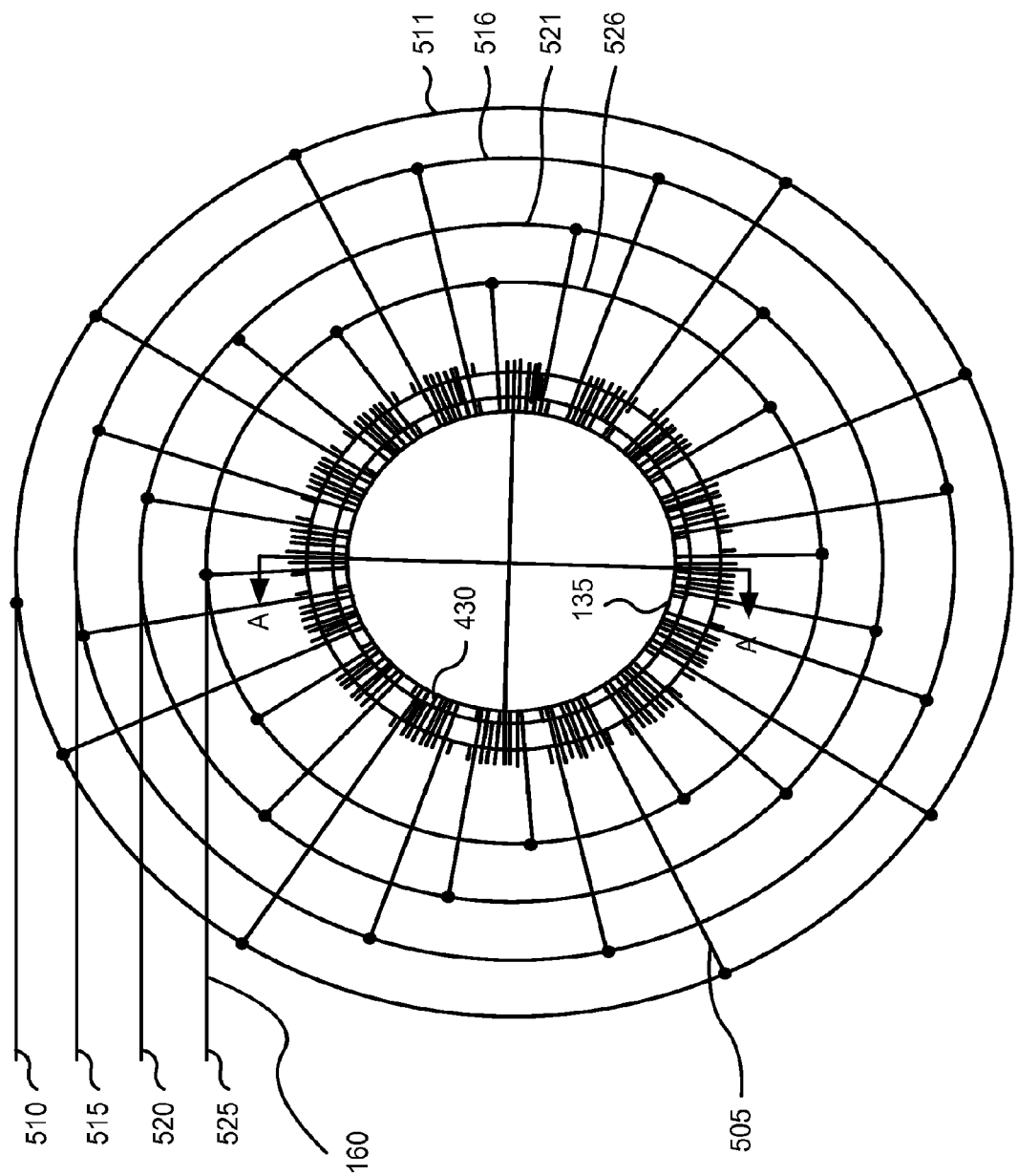
FIG. 5A illustrates a wiring diagram of the tangential solenoids.

FIG. 5A illustrates a wiring diagram of an example embodiment of the stator assembly 135 depicted in FIG. 4H, showing only the plurality of tangential solenoids 430. The stator assembly 135 comprises the plurality of tangential solenoids 430, a plurality of wire connections 505, the plurality of electrical leads 160 depicted in FIG. 1C, and circuit rings 511, 516, 521, and 526. The plurality of electrical leads 160 further comprises individual leads 510, 515, 520, and 525. Each individual lead is connected to a corresponding circuit ring. Individual lead 510 is connected to circuit ring 511, individual lead 515 to circuit ring 516, individual lead 520 to circuit ring 521, and individual lead 525 to circuit ring 526. The plurality of wire connections 505 connects each tangential solenoid 430 to either circuit rings 511 and 516 or circuit rings 521 and 526.

Figure 5B:
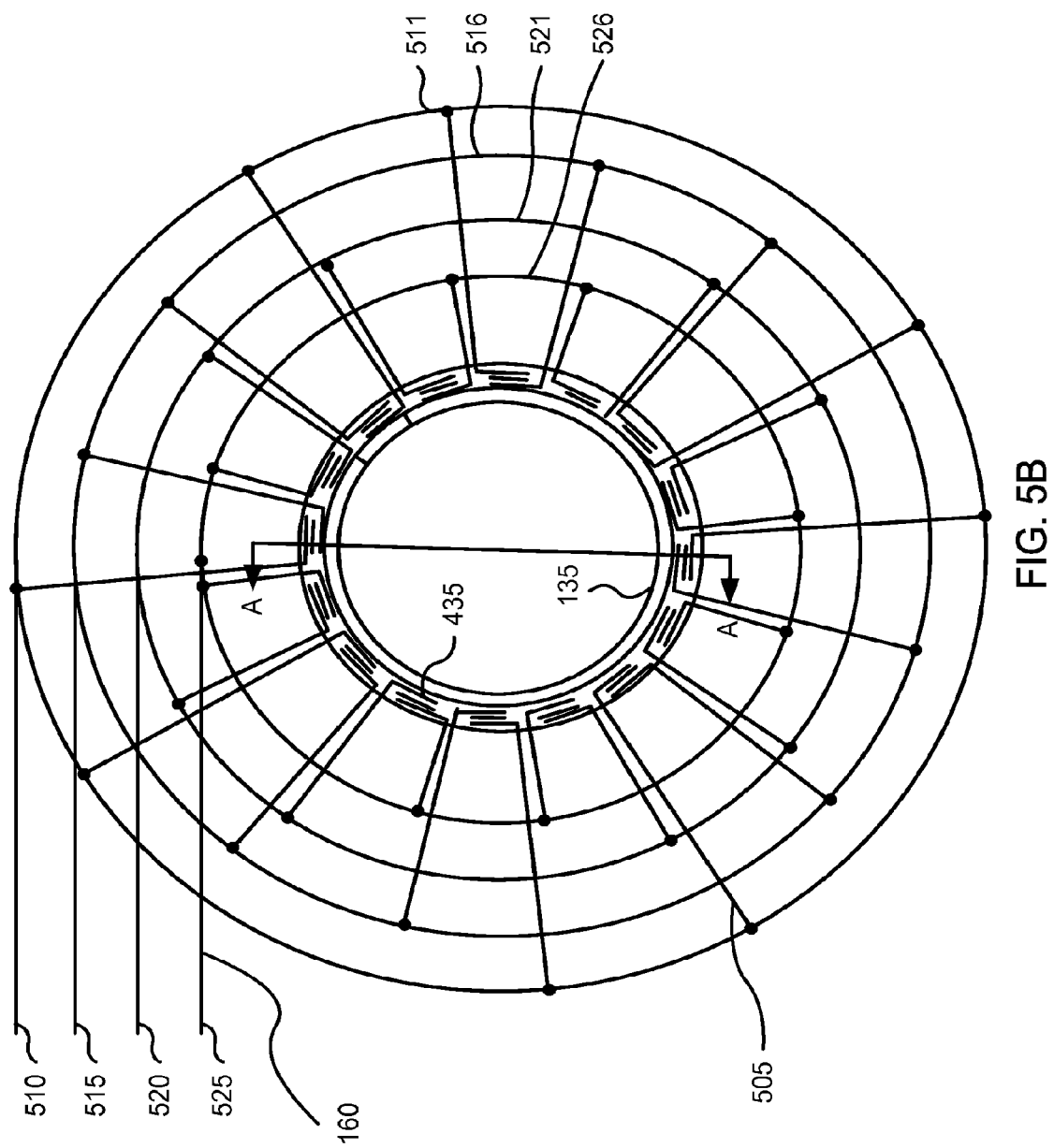
FIG. 5B illustrates a wiring diagram of the radial solenoids.

FIG. 5B illustrates a wiring diagram of the example embodiment of the stator assembly 135 depicted in FIG. 5A, showing only the plurality of radial solenoids 435. The plurality of wire connections 505 connects each radial solenoid 435 to either circuit rings 511 and 516 or circuit rings 521 and 526.

Figure 5C:
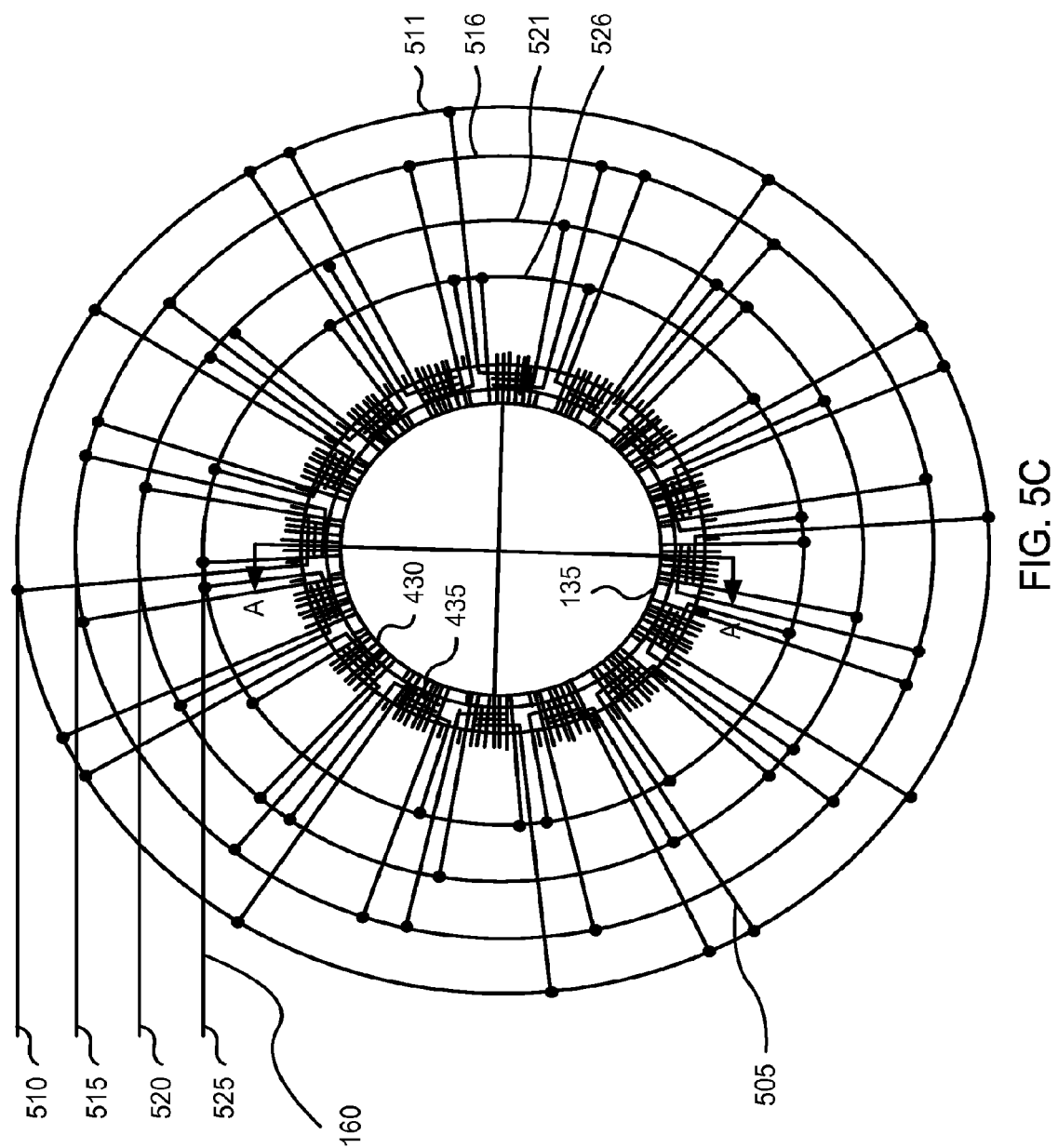
FIG. 5C illustrates a wiring diagram of both the tangential solenoids and radial solenoids.

FIG. 5C illustrates a wiring diagram of the example embodiment of the stator assembly 135 depicted in FIG. 5B, with the addition of the plurality of tangential solenoids 430 depicted in FIG. 5A. As shown in FIG. 4F, each of the plurality of radial solenoids 435 is positioned inside each of the plurality of tangential solenoids 430. Thus, there are an equal number of tangential solenoids 430 and radial solenoids 435. The plurality of wire connections 505 connects each tangential solenoid 430 and each radial solenoid 435 to either circuit rings 511 and 516 or circuit rings 521 and 526.

FIG. 6A illustrates a wiring diagram of the example embodiment of the stator assembly 135 depicted in FIG. 5C. In this example embodiment, FIG. 6A depicts phase one of the motor commutation phases. Individual leads 510 and 515 are inactive, meaning there is no voltage applied to the leads. Individual leads 520 and 525 are active, with a negative voltage applied to lead 520, and a positive voltage applied to lead 525. This applied voltage results in each activated solenoid generating a magnetic field. The direction of the magnetic field generated by each activated solenoid is represented by the plurality of solenoid arrows 605. The magnetic fields generated by each individual activated solenoids result in a magnetic field generated in the central region of the stator assembly 135, represented by the plurality of magnetic field arrows 610. Each of the plurality of magnetic field arrows 610 begins at one of the radial solenoids 435 that generates a magnetic field in the direction towards the center of the stator assembly 135 and ends at one of the radial solenoids 435 that generates a magnetic field in the direction away from the center of the stator assembly 135. In this example embodiment, the plurality of magnetic field arrows 610 depicts a magnetic field generated by an oct-pole field for the Halbach array.

Figure 6C:
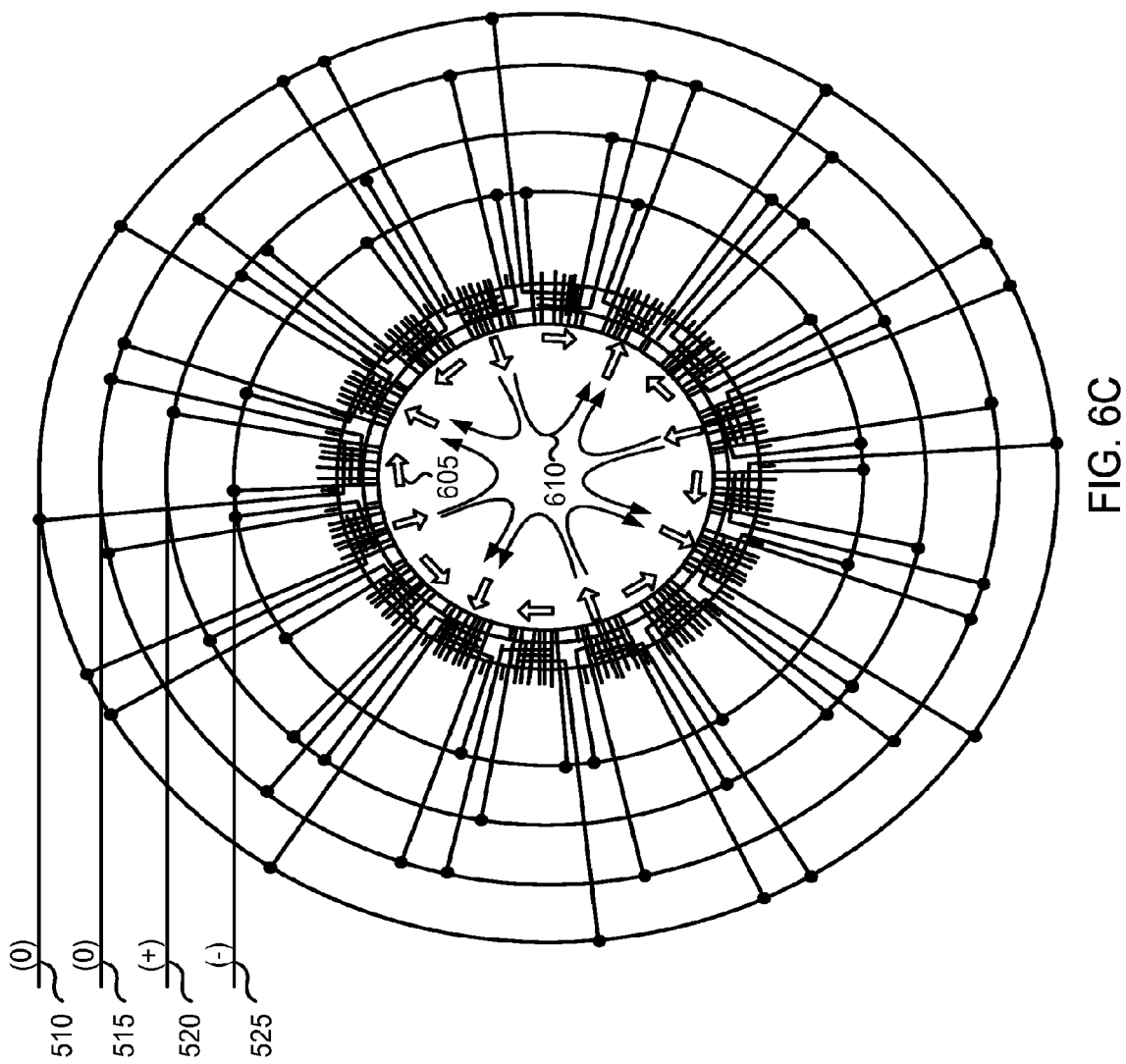

In the wiring diagram of FIG. 6A, the following wiring convention is used. For the tangential solenoids 430, the magnetic field produced by the tangential solenoid 430 points in the direction of the side of the solenoid to which a positive voltage is applied. For example, for the topmost tangential solenoid 615, the left side of the tangential solenoid is connected to external lead 525, which has a positive voltage applied to it. Thus, the magnetic field generated by the topmost tangential solenoid 615 points to the left. For the radial solenoids 435, the magnetic field produced by the radial solenoid 435 points in the direction of the side of the solenoid to which a negative voltage is applied. For example, the outer side of the radial solenoid 620 is connected to external lead 520, which has a negative voltage applied to it. Thus, the magnetic field generated by radial solenoid 620 points away from the center of the plurality of solenoids. The same wiring convention described above is used for FIGS. 6B, 6C, and 6D.

FIG. 6B illustrates a wiring diagram of the example embodiment of the stator assembly 135 depicted in FIG. 6A. In this example embodiment, FIG. 6B depicts phase two of the motor commutation phases. Individual leads 520 and 525 are inactive, meaning there is no voltage applied to the leads. Individual leads 510 and 515 are active, with a negative voltage applied to lead 510, and a positive voltage applied to lead 515. The magnetic field generated by the plurality of solenoids 155 is identical to the magnetic field depicted in FIG. 6A, except the solenoid arrows 605 and magnetic field arrows 610 have rotated clockwise by 22.5 degrees.

FIG. 6C illustrates a wiring diagram of the example embodiment of the stator assembly 135 depicted in FIG. 6A. In this example embodiment, FIG. 6C depicts phase three of the motor commutation phases. Individual leads 510 and 515 are inactive, meaning there is no voltage applied to the leads. Individual leads 520 and 525 are active, with a negative voltage applied to lead 525, and a positive voltage applied to lead 520. The magnetic field generated by the plurality of solenoids 155 is rotated clockwise by 22.5 degrees from the magnetic field depicted in FIG. 6B.

Figure 6D:
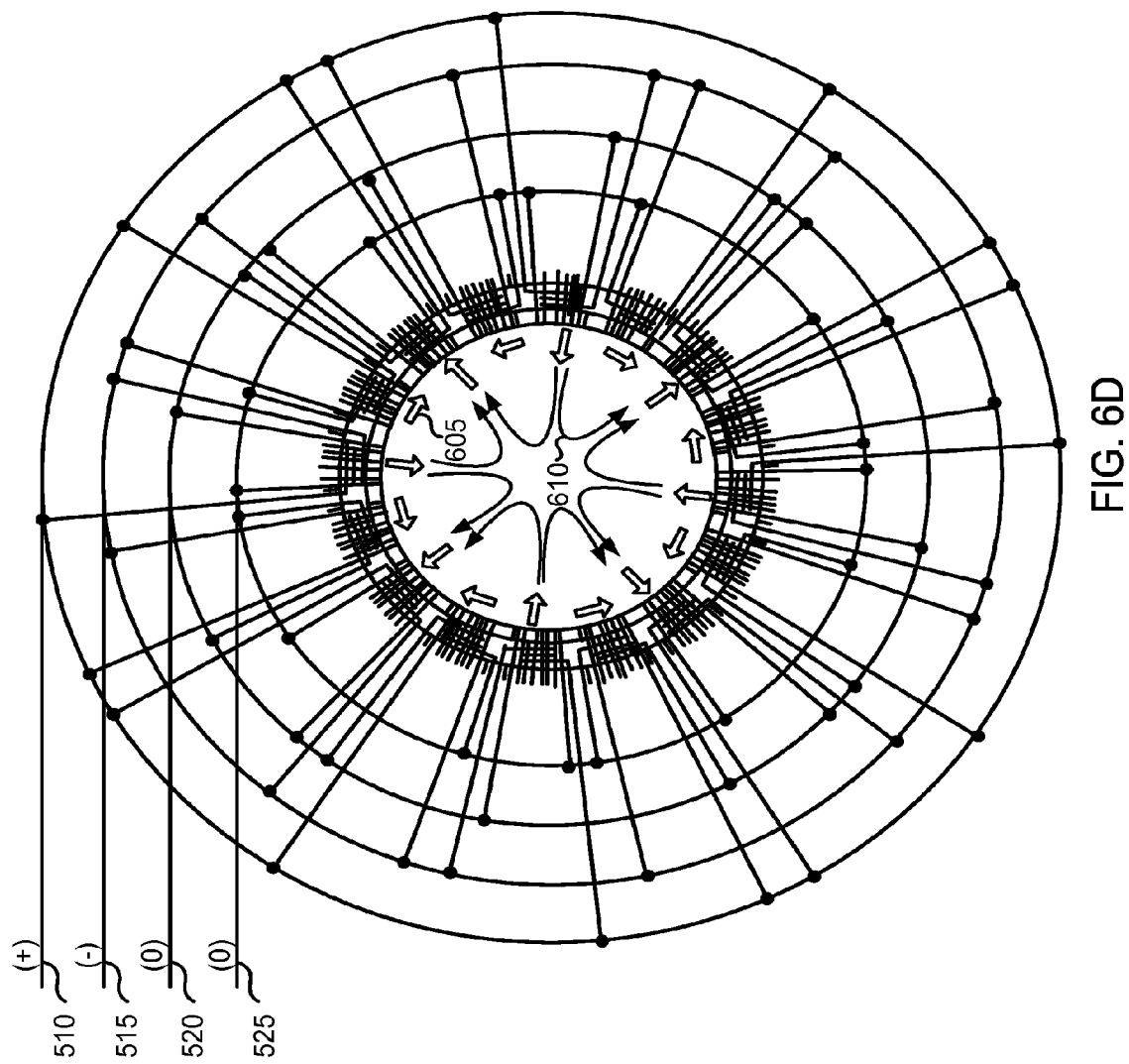

FIG. 6D illustrates a wiring diagram of the example embodiment of the stator assembly 135 depicted in FIG. 6A. In this example embodiment, FIG. 6D depicts phase four of the motor commutation phases. Individual leads 520 and 525 are inactive, meaning there is no voltage applied to the leads. Individual leads 510 and 515 are active, with a negative voltage applied to lead 515, and a positive voltage applied to lead 510. The magnetic field generated by the plurality of solenoids 155 is rotated clockwise by 22.5 degrees from the magnetic field depicted in FIG. 6C. Once phase four of the motor commutation phases is complete, the phases reset to phase 1 and repeat.

In some example embodiments, commutation circuitry is required to commutate the electric motor 101 through the four motor phases depicted in FIGS. 6A through 6D. As the motor transitions from phase 1 to phase 4, the magnetic field depicted by magnetic field arrows 610 rotates clockwise by 90 degrees relative to the stator assembly 135. This example embodiment forms an oct-pole field for the Halbach array and is radially symmetric with eight octants. Therefore, commutating the electric motor 101 from phase four to phase one results in a continuous rotation of the magnetic field depicted by the magnetic field arrows 610 relative to the stator assembly 135.

The plurality of magnets 125 is arranged on the rotor assembly 105 to generate a magnetic field similar to the field depicted by the magnetic field arrows 610. The magnets cannot be activated and deactivated like the plurality of solenoids 155, so the magnetic field generated by the magnets remains stationary relative to the rotor assembly. However, the rotor assembly 105 can rotate freely within the stator assembly 135. Thus, as the commutation circuitry commutates the electric motor 101 through the four phases depicted in FIGS. 6A through 6D, the rotor assembly 105 rotates within the stator assembly 135 to follow the rotating magnetic field. This rotation of the rotor assembly 105 is the desired mechanical output of the electric motor 101, and the conversion of electrical energy to kinetic energy is complete.
Ferrofluid Core As described with respect to FIG. 1B, the sealed compartment formed by the lip 210 of the motor housing 140, inner wall 215 of the motor housing 140, inner ring 415 of the framework 145, and retainer cap 150 is filled with a ferrofluid, immersing the plurality of solenoids 155 in the ferrofluid. A ferrofluid is a liquid that becomes strongly magnetized in the presence of a magnetic field. Ferrofluids are colloidal liquids made of nanoscale ferromagnetic particles suspended in a carrier fluid. The small size of the ferromagnetic particles allows them to remain evenly dispersed in the fluid due to thermal agitation. Each ferromagnetic particle is coated with a surfactant to inhibit the particles from clumping together.

Because the ferrofluid becomes strongly magnetized in the presence of a magnetic field, the ferrofluid can act as a magnetic core for the plurality of solenoids 155. In this example embodiment, the ferrofluid replaces a traditional iron core. The ferrofluid has a high magnetic permeability and confines and guides the magnetic field generated by the plurality of solenoids 155. Due to the fact that the ferromagnetic nanoparticles are able to move freely within the carrier fluid, the ferrofluid is less susceptible to heating in the presence of a magnetic field that changes at a high frequency, such as the magnetic field generated by the plurality of solenoids 155. A core that is less susceptible to heating results in a more efficient motor due to decreased core losses. It is also beneficial to more effectively dissipate any heat that may still be generated, because increased temperatures result in increased resistances in the wires of the plurality of solenoids 155. The ferrofluid also dissipates any generated heat to the surrounding structures through convection.

Figure 7:
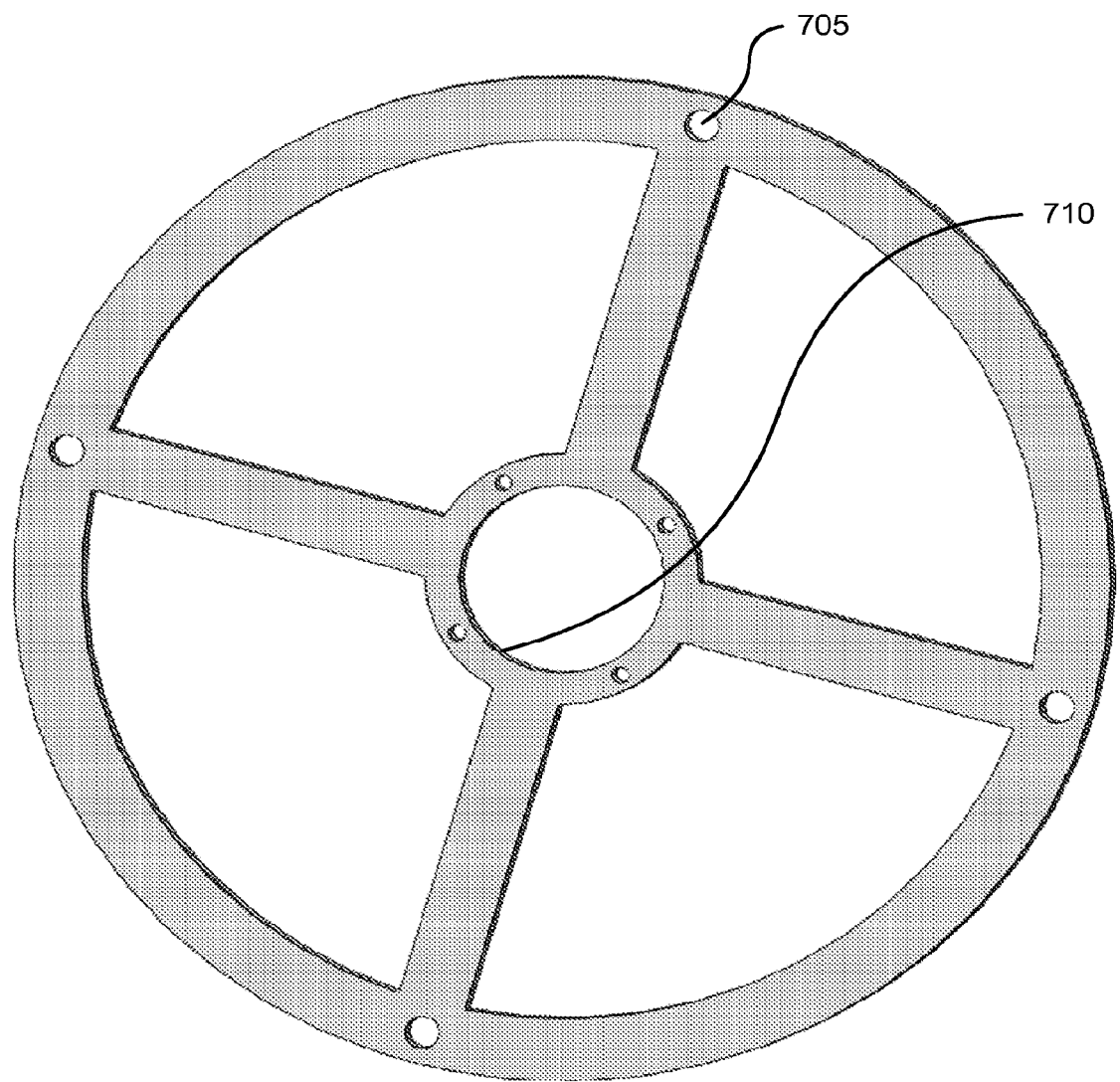
FIG. 7 illustrates a three-dimensional schematic of a bearing retainer.

Additionally, some example embodiments may take advantage of self-circulating ferrofluid. Ferrofluid loses its magnetic properties as its temperature increases. As certain regions of the motor increase in temperature, the ferrofluid nearest those regions would also increase in temperature and lose its magnetic properties. The cooler ferrofluid that is further from the hot regions would then be more magnetic than the ferrofluid nearest the hot regions. This would cause the cooler ferrofluid to displace the ferrofluid nearest the hot regions, resulting in a continuously self-circulating ferrofluid. In one example embodiment, the ferrofluid comprises iron nanoparticles suspended in an oil-based carrier fluid. Other example embodiments of the ferrofluid may comprise nanoparticles of various other materials suspended in a variety of different carrier fluids.
Additional Motor Components FIG. 7 illustrates a three-dimensional schematic of the bearing retainer 120. This example embodiment of the bearing retainer 120 comprises a plurality of holes 705 and a bearing cutout 710. The plurality of holes 705 are located around the circumference of the bearing retainer 120 and can be used to secure the bearing retainer 120 to the motor housing 140 by any of the methods described in relation to FIG. 1B. The bearing 115 is housed inside the bearing cutout 710. In this example embodiment of the bearing retainer 120, the inner diameter of the bearing cutout 710 is slightly smaller than the outer diameter of the bearing 115, resulting in an interference fit between the bearing 115 and the bearing cutout 710. In other embodiments, the bearing 115 is fixed inside the bearing cutout 710 via different methods, such as an adhesive or a set screw. In this example embodiment, the bearing retainer 120 is made from aluminum. In other example embodiments, the bearing retainer 120 may be made from a variety of other materials.

Figure 8:
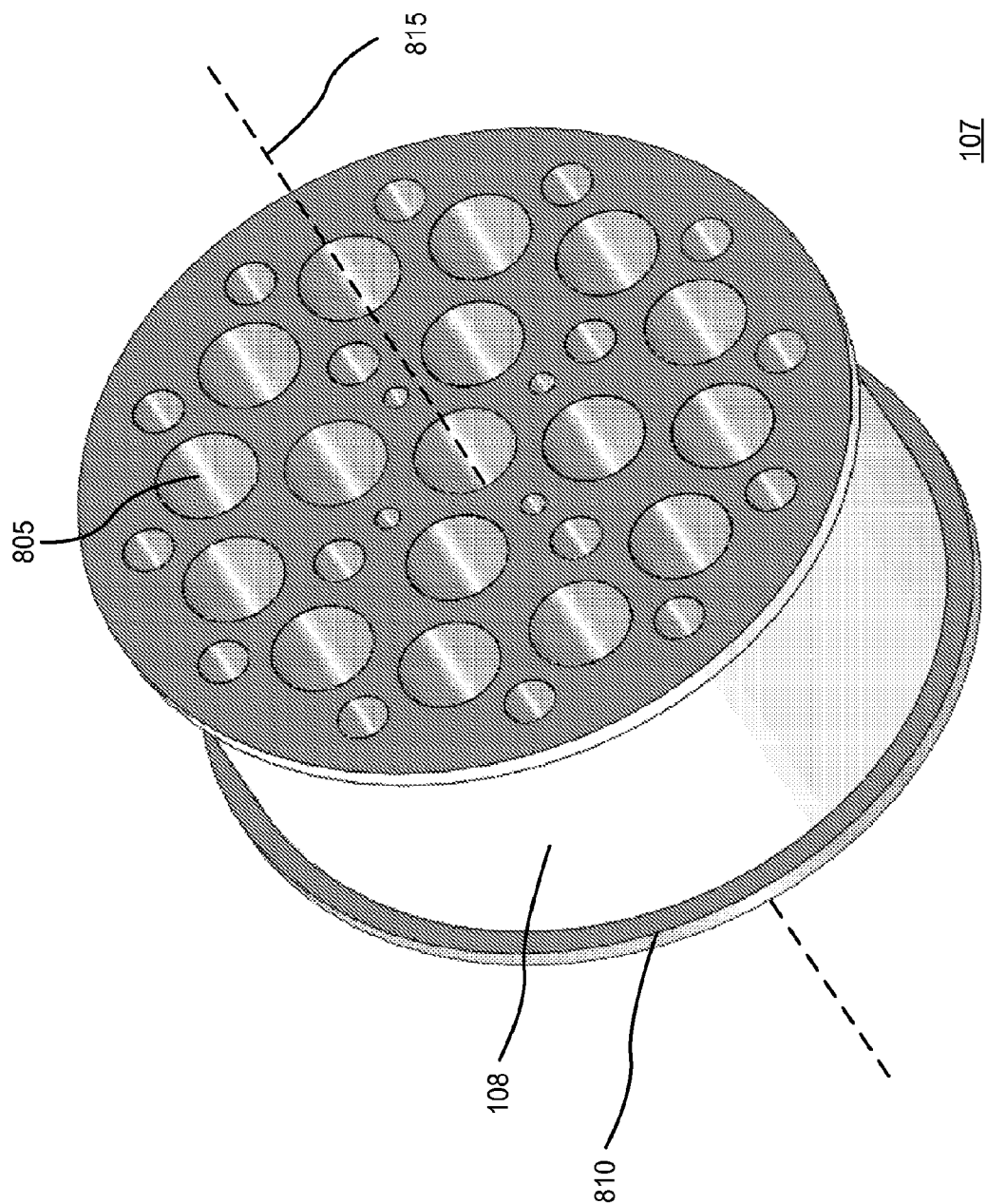
FIG. 8 illustrates a three-dimensional schematic of a shaft buffer.

FIG. 8 illustrates a three-dimensional schematic of the shaft buffer 107. The shaft buffer 107 comprises an outer circumference 108, a plurality of holes 805, one or more lips 810, and an axis 815. The one or more lips 810 extend slightly past the outer circumference 108 of the shaft buffer 107. In one embodiment, the purpose of the holes 805 is to decrease the overall mass of the shaft buffer 107. In another embodiment, the purpose of the holes 805 is to increase airflow through the shaft buffer 107 to aid in convective cooling. The outer circumference 108 of the shaft buffer 107 is congruent and concentric with the inner circumference 126 of the plurality of magnets 125. The one or more lips 815 prevent the plurality of magnets 125 from moving along the axis 815 of the shaft buffer 107. The axis 815 of the shaft buffer 107 is the same axis that the entire rotor assembly 105 rotates around. In this example embodiment, the shaft buffer 107 is made from aluminum. In other example embodiments, the shaft buffer 107 may be made from a variety of non-ferrous materials.

Figure 9:
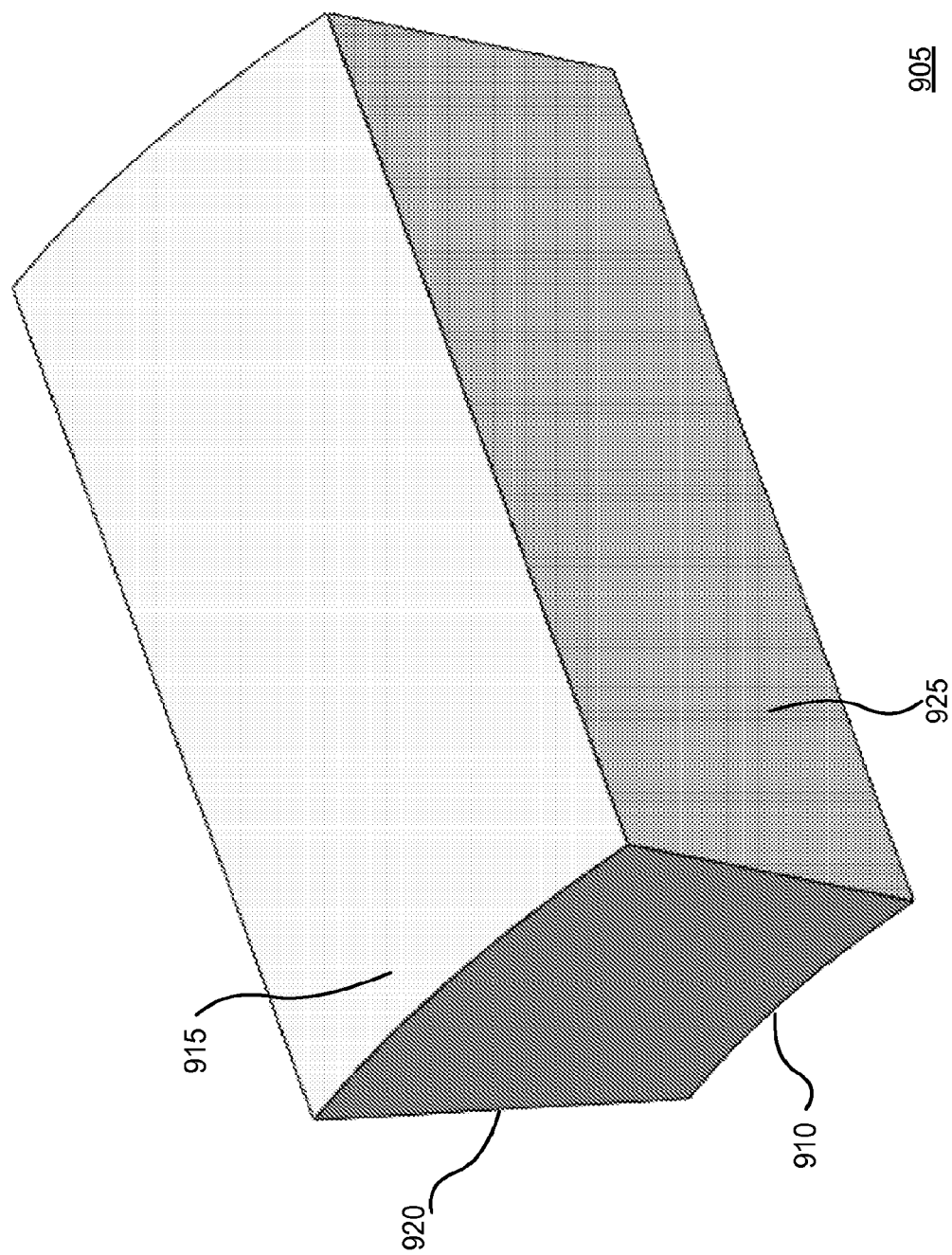
FIG. 9 illustrates a three-dimensional schematic of a magnet.

FIG. 9 illustrates a three-dimensional schematic of a magnet 905. The magnet 905 is one of the plurality of magnets 125 in the rotor assembly 105. The magnet comprises an inner surface 910, an outer surface 915, a left surface 920, and a right surface 925. In this example embodiment, the inner surface 910 and outer edge 915 are curved such that when multiple magnets 905 are arranged in a plurality of magnets 125 in the shape of an annulus, the plurality of magnets 125 form a cylindrical shell. In this example embodiment, the left surface 920 and right surface 920 are flat such that multiple magnets 905 can be arranged to form a cylindrical shell as described above. The inner circumference of the cylindrical shell is the inner circumference 126 of the plurality of magnets 125, and is concentric and congruent to the outer circumference 108 of the shaft buffer 107. In other example embodiments, the magnet 905 may be a different geometric shape that still allows multiple magnets 905 to be arranged in an annulus. In this example embodiment, the magnet 905 is a neodymium iron boron permanent magnet. In other example embodiments, the magnet 905 may be various different kinds of permanent magnets. In other example embodiments, the magnet 905 may be an electromagnet.

Figure 10:
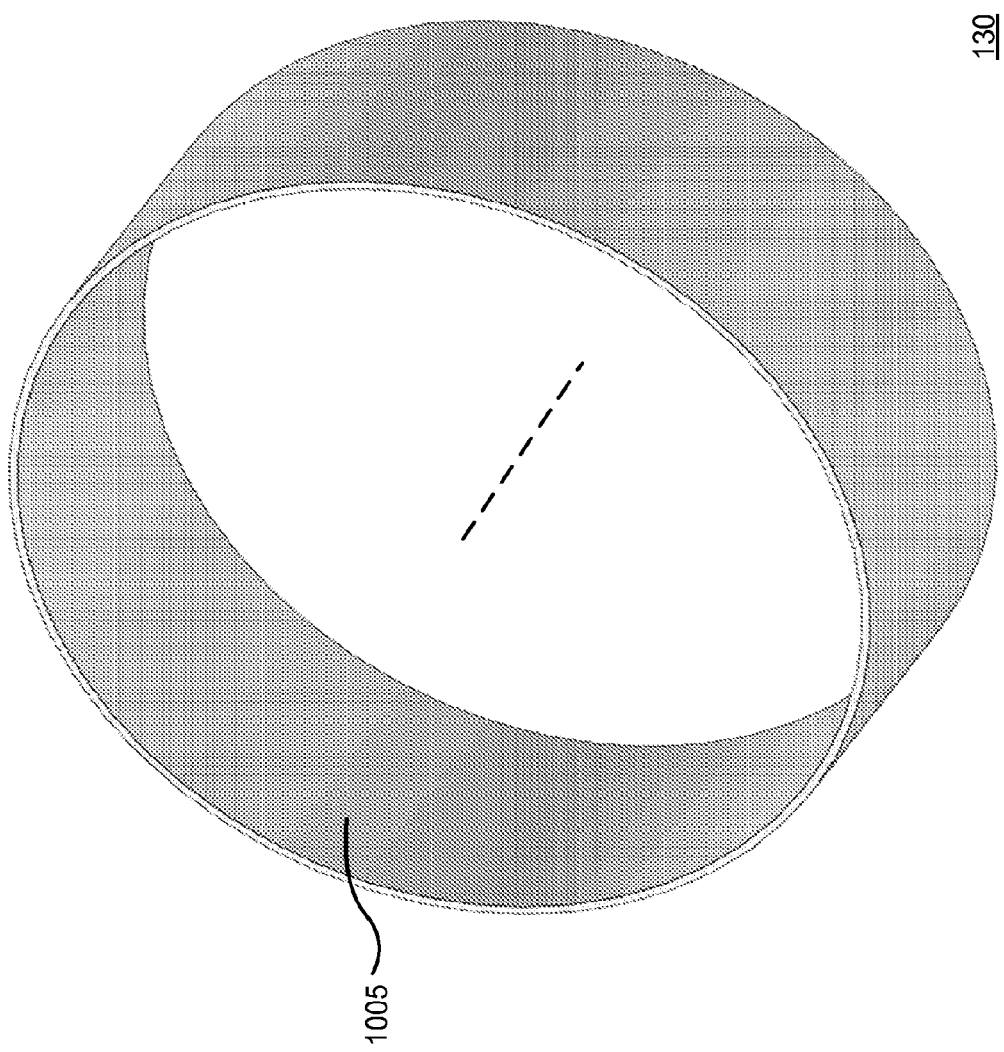
FIG. 10 illustrates a three-dimensional schematic of a retaining ring.

FIG. 10 illustrates a three-dimensional schematic of the retaining ring 130. The retaining ring 130 comprises an inner surface 1005. The inner surface 1005 has a circumference that is congruent and concentric to the outer circumference 127 of the plurality of magnets 125. The plurality of magnets 125 is positioned in between the shaft buffer 107 and the retaining ring 130. The retaining ring secures the plurality of magnets 125 to the shaft buffer 107 as part of the rotor assembly 105. In this example embodiment, the retaining ring 130 is made of aluminum. In other example embodiments, the retaining ring 130 can be made from a variety of nonferrous materials.

Figure 11:
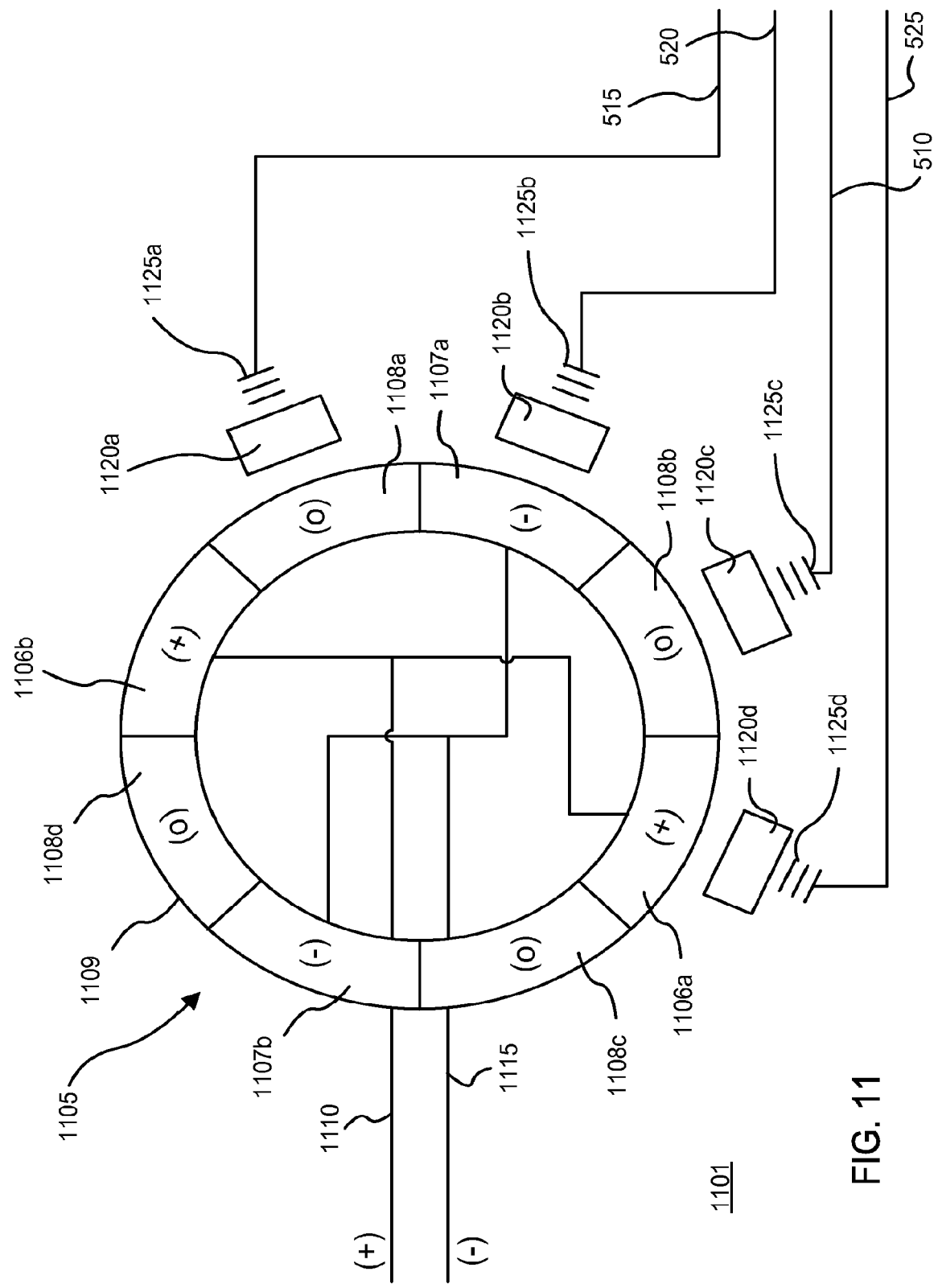
FIG. 11 illustrates a wiring diagram of a commutation circuit.

In some embodiments, additional electronic circuitry is required to control the electric motor 101. In some embodiments, the additional electronic circuitry is commutation circuitry to commutate the electric motor 101 through the commutation phases depicted in FIGS. 6A-6D. FIG. 11 illustrates an example embodiment of commutation circuitry used to commutate the electric motor 101 through the commutation phases depicted in FIGS. 6A-6D. The commutation circuitry 1101 comprises a commutator 1105, a positive lead 1110, a negative lead 1115, a plurality of brushes 1120, and a plurality of springs 1125. The commutator 1105 further comprises a plurality of positive contacts 1106, a plurality of negative contacts 1107, a plurality of neutral contacts 1108, and an outer circumference 1109. The positive contacts 1106 are connected to the positive lead 1110, the negative contacts 1107 are connected to the negative lead 1115, and the neutral contacts are disconnected. In this example embodiment, the commutator 1105 is fixed to the rotor assembly 105 such that the commutator 105 is concentric with the rotor assembly 105. Thus, as the rotor assembly 105 rotates with reference to the stator assembly 135, the commutator 1105 also rotates with reference to the stator assembly 135. The plurality of brushes 1120 and the plurality of springs 1125 are fixed to the stator assembly 135 such that the brushes 1120 contact the outer circumference 1109 of the commutator 1105. In this example embodiment, each of the brushes 1120 contacts a different contact on the commutator 1105. In the position depicted in FIG. 11, the brush 1120*a* contacts neutral contact 1108*a*, brush 1120*b* contacts one of the negative contacts 1107*a*, brush 1120*c* contacts another one of the neutral contacts 1108*b*, and brush 1120*d* contacts one of the positive contacts 1106*a*. The springs 1125 exert a force on each brush 1120 such that each brush 1120 securely makes contact with the outer circumference 1109 of the commutator 1105. Spring 1125*a* is connected to individual lead 515, spring 1125*b* is connected to individual lead 520, spring 1125*c* is connected to individual lead 510, and spring 1125*d* is connected to individual lead 525.

In the position depicted in FIG. 11, the positive lead 1110 is electrically connected to positive contact 1106*a*, which contacts and is electrically connected to brush 1120*d*, which is electrically connected to spring 1125*d*, which is electrically connected to individual lead 525. The negative lead 1115 is electrically connected to 1107*a*, which contacts and is electrically connected to brush 1120*b*, which is electrically connected to 1125*b*, which is electrically connected to individual lead 520. When a positive voltage is applied to positive lead 1110, the positive voltage is conducted to individual lead 525. When a negative voltage is applied to negative lead 1115, the negative voltage is conducted to individual lead 520. No voltage is applied to individual leads 510 and 515.

Referring now to FIG. 6A, it is seen that the commutator position depicted in FIG. 11 results in the commutation phase depicted in FIG. 6A: a positive voltage is applied to individual lead 525, a negative voltage is applied to individual lead 520, and no voltage is applied to individual leads 510 and 515. Referring back to FIG. 11, as the rotor assembly 105 rotates clockwise, the commutator 1105 also rotates clockwise. In this example embodiment, once the commutator 1105 has rotated clockwise 22.5 degrees, each brush 1120 is in contact with a different contact on the commutator 1105. Once the commutator 1105 has rotated clockwise 22.5 degrees relative to the position depicted in FIG. 11A, the commutator position results in the commutation phase depicted in FIG. 6B.

As the commutator 1105 continues to rotate clockwise, the brushes 1120 will contact different contacts on the commutator 1105 such that the appropriate voltages are applied to individual leads 510, 515, 520, and 525 to activate the commutation phases depicted in FIGS. 6A-6D. In this example embodiment, the commutator 1105 comprises two positive contacts 1106, two negative contacts 1107, and four neutral contacts 1108. In other embodiments, the commutator 1105 may comprise a greater or fewer number of contacts. In alternative embodiments, the electric motor 101 may be driven by a variable frequency drive instead of the commutation circuitry 1101.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

As used herein any reference to "one embodiment," "an embodiment," or "example embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" arc employed to describe elements and components of the embodiments herein. This is done merely for convenience and to give a general sense of the invention. This description should be read to include one or at least one and the singular also includes the plural unless it is obvious that it is meant otherwise.

Specific embodiments are described above with respect to FIGS. 1-10. Referring to FIG. 2, the motor housing 140 has a plurality of holes 205. The holes 205 may aid in cooling the motor housing 140 and may also aid in reducing the overall mass of the motor housing 140. Referring to FIG. 8, the shaft buffer 107 has a plurality of holes 805. The holes 805 may aid in cooling the shaft buffer 107 and may also aid in reducing the overall mass of the shaft buffer 107. Reducing the mass of the shaft buffer 107 advantageously reduces the rotational inertia of the entire rotor assembly 105. Referring now to FIG. 9, the depicted wedge shape of the magnet 905 advantageously allows a plurality of magnets to be easily arranged in an annulus, as described with respect to FIG. 1B.

As discussed with respect to FIG. 1B and FIG. 4A, the sealed cavity housing the ferrofluid comprises the inner ring 415 of the framework 145. Using the inner ring 415 as a sealing member of the sealed cavity advantageously allows the framework 145 to remain fixed within the sealed cavity while reducing the number of components that need to be manufactured. Referring now to FIG. 4G, the configuration of the framework 145 allows each radial solenoid 435 to advantageously be positioned within each tangential solenoid 430, which allows for a more compact solenoid configuration.

Upon reading this disclosure, those of skill in the art will appreciate still additional alternative structural and functional designs for an electric motor utilizing a Halbach array and a ferrofluid core through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. An electric motor apparatus, comprising:
a rotor assembly comprising an outer circumference and a plurality of magnets, the plurality of magnets comprising an inner circumference and an outer circumference, the plurality of magnets arranged such that the outer circumference of the plurality of magnets is congruent and concentric to the outer circumference of the rotor assembly, and such that the plurality of magnets generate a diminished magnetic field outside of the outer circumference of the plurality of magnets that cancels out to near zero and an augmented magnetic field inside of the inner circumference of the plurality of magnets;
a stator assembly comprising an inner circumference greater than the outer circumference of the rotor assembly, the stator assembly surrounding the rotor assembly, the stator assembly comprising a plurality of solenoids with an inner circumference and an outer circumference, the plurality of solenoids arranged such that the inner circumference of the solenoids is congruent and concentric to the inner circumference of the stator assembly, and the solenoids having a Halbach array effect such that the plurality of solenoids generate a diminished magnetic field outside of the outer circumference of the plurality of solenoids to cancel out to substantial zero and an augmented magnetic field inside of the inner circumference of the plurality of solenoids; and commutation circuit that controls the plurality solenoids.

2. The electric motor apparatus of claim 1, wherein the stator assembly comprises a compartment to contain a ferrofluid, the plurality of solenoids residing within the compartment, and the plurality of solenoids immersed in the ferrofluid.

3. The electric motor apparatus of claim 2, wherein the ferrofluid fills an open cavity within each of the plurality of solenoids.

4. The electric motor apparatus of claim 3, wherein the stator assembly comprises a motor housing surrounding the plurality of solenoids and in contact with the ferrofluid.

5. The electric motor apparatus of claim 4, wherein the motor housing comprises a plurality of holes.

6. The electric motor apparatus of claim 1, wherein the magnets are dipole elements.

7. The electric motor apparatus of claim 1, wherein each of the plurality of magnets comprises a wedge shape, each of the plurality of magnets having a vector direction of magnetization to rotate at a rate twice that of a magnet position vector from the center of the rotor.

8. The electric motor apparatus of claim 1, wherein the plurality of magnets comprises 16 total magnets.

9. The electric motor apparatus of claim 8, wherein the magnetic field from the plurality of magnets comprises an oct-pole field.

10. The electric motor apparatus of claim 1, wherein the plurality of solenoids comprises an equal number of radial and tangential solenoids, the radial solenoids oriented such that the axis of each radial solenoid is in a direction radial to a center of the plurality of solenoids, and the tangential solenoids oriented such that the axis of each tangential solenoid is in a direction tangential to the inner circumference of the plurality of solenoids.

11. The electric motor apparatus of claim 10, wherein each radial solenoid is positioned inside a corresponding tangential solenoid.

12. The electric motor apparatus of claim 1, wherein the rotor assembly further comprises a shaft buffer with an outer circumference congruent to the inner circumference of the plurality of magnets, the shaft buffer residing within the plurality of magnets.

13. The electric motor apparatus of claim 12, wherein the shaft buffer further comprises a plurality of holes.

14. An electric motor apparatus, comprising:
a rotor structured to rotate a plurality of magnets, the rotor comprising an outer circumference and the plurality of magnets, the plurality of magnets comprising an inner circumference and an outer circumference, the plurality of magnets arranged such that the outer circumference of the plurality of magnets is congruent and concentric to the outer circumference of the rotor, and such that the plurality of magnets generate a diminished magnetic field outside of the outer circumference of the plurality of magnets that cancels out to near zero and an augmented magnetic field inside of the inner circumference of the plurality of magnets;
a stator means structured to maintain a plurality of solenoids in a stationary position with respect to the rotor, the stator comprising an inner circumference greater than the outer circumference of the rotor, the stator surrounding the rotor, the stator comprising the plurality of solenoids with an inner circumference and an outer circumference, the plurality of solenoids arranged such that the inner circumference of the solenoids is congruent and concentric to the inner circumference of the stator, and such that the plurality of solenoids generate a diminished magnetic field outside of the outer circumference of the plurality of solenoids to cancel out to substantial zero and an augmented magnetic field inside of the inner circumference of the plurality of solenoids; and commutation circuit that controls the plurality solenoids.

15. The electric motor apparatus of claim 14, wherein the stator comprises a compartment containing a ferrofluid, the plurality of solenoids residing within the compartment, and the plurality of solenoids immersed in the ferrofluid.

16. The electric motor apparatus of claim 14, wherein each of the plurality of solenoids comprises an open cavity, the open cavity filled with a ferrofluid.

17. The electric motor apparatus of claim 15, wherein the stator comprises a motor housing surrounding the plurality of solenoids and in contact with the ferrofluid.

18. The electric motor apparatus of claim 17, wherein the motor housing comprises a plurality of holes.

19. The electric motor apparatus of claim 14, wherein the plurality of solenoids comprises an equal number of radial and tangential solenoids, each of the radial and tangential solenoids comprising an axis, the radial solenoids oriented such that the axis of each radial solenoid is in a direction radial to a center of the plurality of solenoids, and the tangential solenoids oriented such that the axis of each tangential solenoid is in a direction tangential to the inner circumference of the plurality of solenoids.

20. The electric motor apparatus of claim 19, wherein each radial solenoid is positioned inside a corresponding tangential solenoid.

\* \* \* \* \*